United States Patent [19]

Nakayama et al.

[11] Patent Number: 5,062,141
[45] Date of Patent: Oct. 29, 1991

[54] METHOD OF SEGMENTING CHARACTERS IN LINES WHICH MAY BE SKEWED, FOR ALLOWING IMPROVED OPTICAL CHARACTER RECOGNITION

[75] Inventors: Hiroshi Nakayama, Tokyo; Keiji Kojima, Kawasaki; Gen Sato, Yokohama, all of Japan

[73] Assignee: Ricoh Company, Ltd., Japan

[21] Appl. No.: 361,031

[22] Filed: Jun. 2, 1989

[30] Foreign Application Priority Data

Jun. 2, 1988 [JP] Japan ................................ 63-136350
Mar. 9, 1989 [JP] Japan .................................. 1-57487
Apr. 17, 1989 [JP] Japan ................................... 1-97187

[51] Int. Cl.$^5$ ............................................ G06K 9/00
[52] U.S. Cl. ........................................ 382/9; 382/16; 382/20; 382/22
[58] Field of Search ................... 382/9, 10, 16, 19, 20, 382/22, 28, 50

[56] References Cited

U.S. PATENT DOCUMENTS 4,013,999   3/1977   Erwin et al. ................. 340/146.3 H

FOREIGN PATENT DOCUMENTS 33233   8/1986   Japan .

Primary Examiner—Michael Razavi
Attorney, Agent, or Firm—Mason, Fenwick & Lawrence

[57] ABSTRACT

A method of segmenting characters of a document image comprises the steps of dividing the document image into a plurality of divided regions and setting a check width with respect to each of the divided regions, where each check width is greater than or equal to a width of a corresponding one of the divided regions so that the check widths of two mutually adjacent divided regions partially overlap each other, reading image data amounting to one line of the document image, obtaining from the image data horizontal projections of each line data within each of the check widths, where each horizontal projection is a number of black picture elements in a corresponding data line within a check width and each data line is made up of a plurality of picture elements arranged horizontally, segmenting a line based on the horizontal projections, obtaining from the image data vertical projections, where each vertical projection is a number of black picture elements in a vertical direction, determining a character segmentation range based on the vertical projections, and segmenting each character of the line within the character segmentation range.

10 Claims, 33 Drawing Sheets

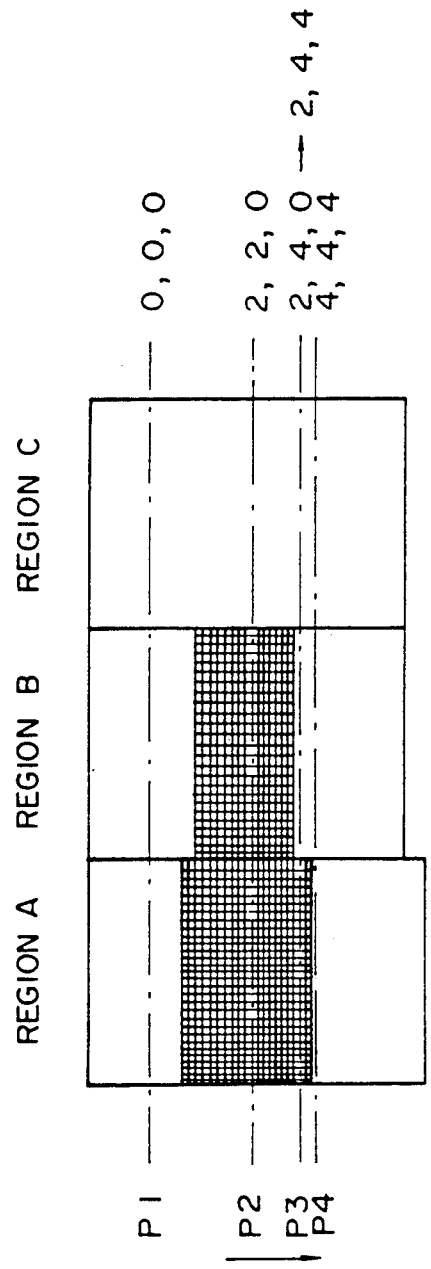

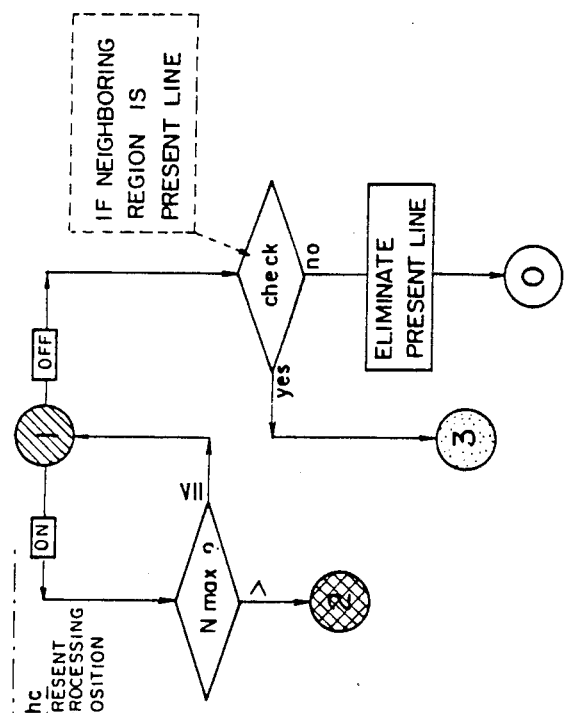
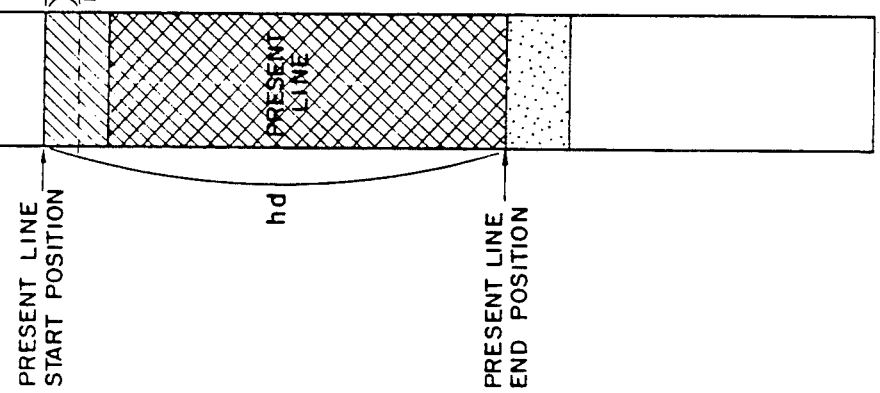
FIG.18B
FIG.18A

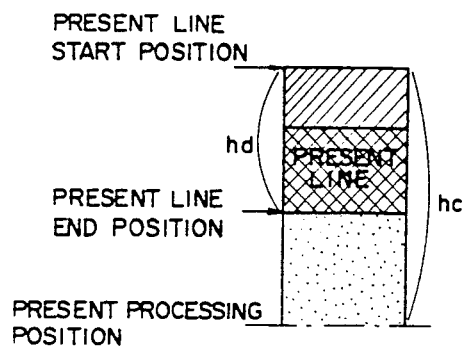
FIG.19A
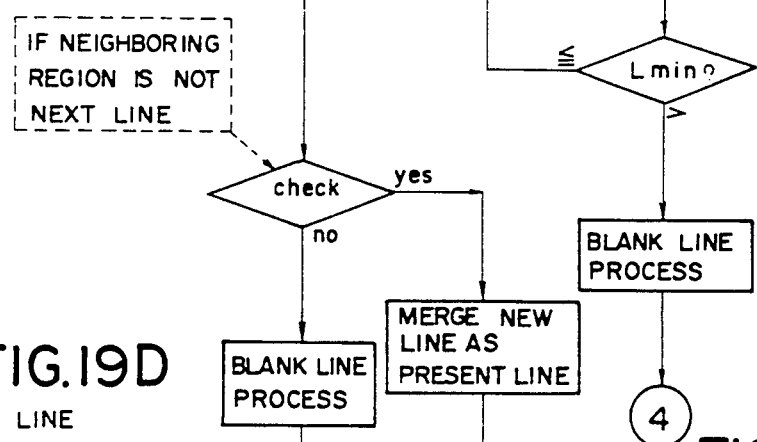
FIG.19B
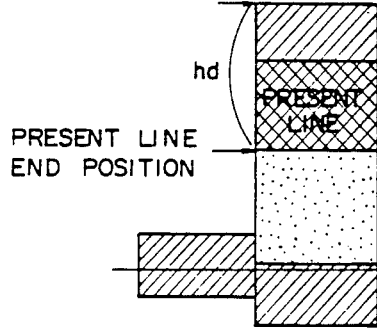
FIG.19D
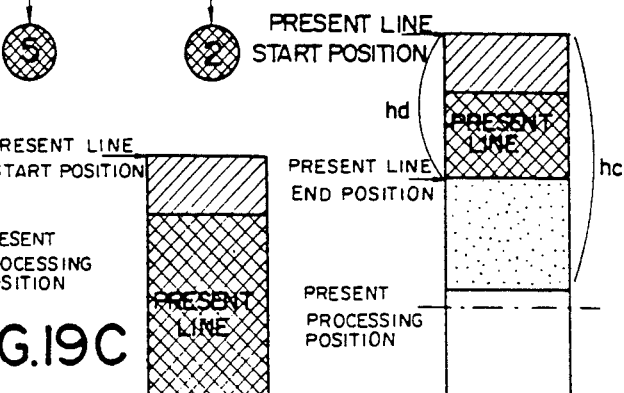
FIG.19C
FIG.19E

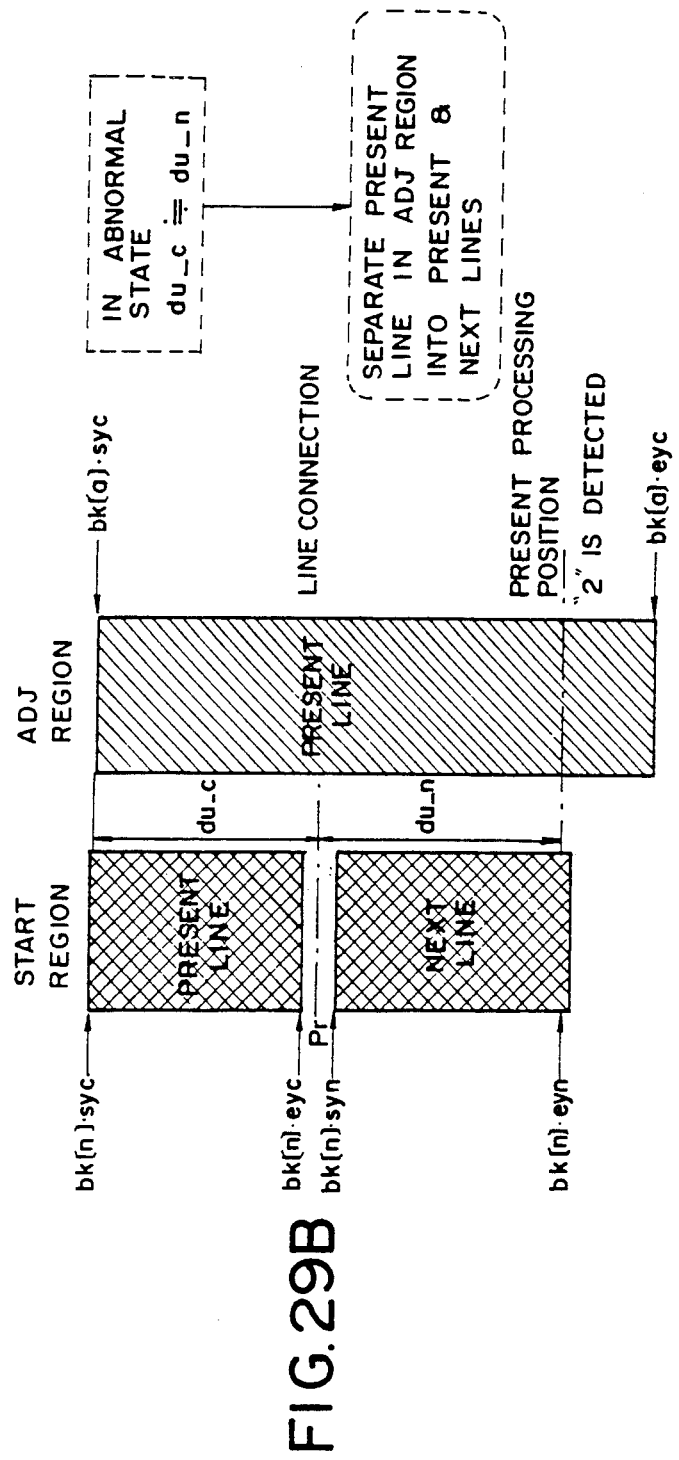

METHOD OF SEGMENTING CHARACTERS IN LINES WHICH MAY BE SKEWED, FOR ALLOWING IMPROVED OPTICAL CHARACTER RECOGNITION

BACKGROUND OF THE INVENTION

The present invention generally relates to methods of segmenting characters of document images, and more particularly to a method of segmenting characters of a document image which may include a skew.

Generally, an optical character recognition apparatus or the like obtains horizontal projections of an input document image (binary image) in a direction of lines of characters and vertical projections of the input document image in a direction perpendicular to the direction of the lines. A line segmentation is made by discriminating each line and each space between the lines from the horizontal projections, and a character segmentation is made by determining a range of the character segmentation from the vertical projections.

The horizontal and vertical projections are sometimes also referred to as peripheral distributions. Usually, the projection corresponds to a number of black picture elements (or white picture elements in a special case) within a certain region. The number of black picture elements in one data line within the certain region is counted, and this counted value is called the horizontal projection. The data line is made up of horizontally arranged picture elements. The horizontal projection is obtained for each of the data lines within the certain region, and the obtained horizontal projections are referred to as the "horizontal projections of the certain region" or simply "horizontal projections". The vertical projection is similar to the horizontal projection except that the black picture elements are counted in a vertical direction which is perpendicular to the horizontal direction.

But when the document image includes a skew such as a case where the lines of characters are greatly inclined in the document image, the horizontal projections of two successive lines become continuous when the horizontal projections are obtained with respect to the full width of the document image, and it becomes impossible to make a normal line segmentation. As a result, it becomes impossible to make a normal character segmentation.

In order to cope with the skew included in the document image, there is a known method which divides the document image in the direction of the lines into equal regions. The line segmentation is made by discriminating each line or each space between the lines from the horizontal projections within the range of the divided region for each of the divided regions. The character segmentation is made by determining the range of the character segmentation from the vertical projections of the segmented lines.

However, this known method suffers problems in that it is difficult to make the segmentation of a character which is located at a boundary between two divided regions, a special and troublesome process is required to make the segmentation of such a character, and a processing speed as a whole becomes poor.

FIG. 1 shows a case where a character "y" is located at a boundary between two divided regions I and II. It is assumed for the sake of convenience that there does not exist a character which has a height greater than that of a character "n" in the divided region I and there does not exist a character which has a height greater than that of the character "y" in the divided region II. In this case, the start and end positions of the line in the divided regions I and II are determined as shown from the respective horizontal projections.

Basically, the character segmentation is made by respectively setting the start and end positions of the line in each divided region as the top and bottom ends of the range of the character segmentation within the divided region. However, in the case of the character "y" which is located at the boundary between the two divided regions I and II and spans the two divided regions I and II, the start and end positions of the line differ between the divided region I in which a left portion of the character "y" belongs and the divided region II in which a right portion of the character "y" belongs as may be seen from FIG. 1. Moreover, even the line end position of the line which is within the divided region II and has the greater line width is still above the bottom end of the character "y" at the boundary. Accordingly, when the left portion of the character "y" is segmented by taking the start and end positions of the line within the divided region I as the top and bottom ends of the range of the character segmentation and the right portion of the character "y" is segmented by taking the start and end positions of the line within the divided region II as the top and bottom ends of the range of the character segmentation, a lower portion of the character "y" greatly drops out. On the other hand, even when the start and end positions of the line within the divided region II which are respectively higher and lower than the start and end positions of the line within the divided region I are taken as the top and bottom ends of the range of the character segmentation, the lower portion of the character "y" still drops out.

Therefore, when the character is located at the boundary between two divided regions and spans the two divided regions, it is difficult to unitarily determine the top and bottom ends of the range of the character segmentation. Furthermore, it requires a complex process to normally make the segmentation of the character located at the boundary.

On the other hand, as a method of processing the skew, there is a known method in which the extraction of the vertical projections is carried out simultaneously or in parallel to the line segmentation. But conventionally, the extraction of the vertical projections is carried out only with respect to a present line which is the subject of the segmentation. For this reason, a re-processing of the image data and a back-tracking are needed to extract the vertical projections of a next line, and there is a problem in that the processing efficiency is poor.

SUMMARY OF THE INVENTION

Accordingly, it is a general object of the present invention to provide a novel and useful method of segmenting characters of a document image, in which the problems described above are eliminated.

Another and more specific object of the present invention is to provide a method of segmenting characters of a document image which has lines of characters thereon respectively extending generally in a first direction, comprising the steps of dividing the document image in the first direction into a plurality of divided regions and setting a check width with respect to each of the divided regions taken along the first direction, where each check width is greater than or equal to a width of a corresponding one of the divided regions taken along the first direction so that the check widths of two mutually adjacent divided regions partially overlap each other, reading image data amounting to one line of the document image, obtaining from the image data horizontal projections of each line data within each of the check widths, where each horizontal projection is a number of black picture elements in a corresponding data line within a check width and each data line is made up of a plurality of picture elements arranged in the first direction, segmenting a line based on the horizontal projections, obtaining from the image data vertical projections, where each vertical projection is a number of black picture elements in a second direction which is perpendicular to the first direction, determining a character segmentation range based on the vertical projections, and segmenting each character of the line within the character segmentation range. According to the method of the present invention, it is possible to positively segment the character even when the document image includes a skew and the character is located at a boundary between two mutually adjacent divided regions, without the need of a special process. The segmentation process is simple and the efficiency thereof is improved. In addition, it is possible to prevent a segmentation error which is conventionally caused by a skew in the document image, a noise in the document image, a document image including a large skew and a blank line, a document image including a large skew and a narrow interval between the lines, and a document image including an underline which does not touch the character. The reliability of the line segmentation and character segmentation is hence greatly improved, making it possible to carry out the character segmentation at a high speed.

Other objects and further features of the present invention will be apparent from the following detailed description when read in conjunction with the accompanying drawings.

BRIEF DESCRIPTION OF THE DRAWINGS

FIG. 17 is a diagram for explaining a concept of a blank line process;

FIGS. 18A and 18B respectively are diagrams for explaining a segmentation state "1" and a determination process thereof in a third embodiment of the method of segmenting characters of a document image according to the present invention;

FIGS. 19A through 19E respectively are diagrams for explaining a segmentation state "3" and a determination process thereof in the third embodiment;

FIGS. 29A, 29B, 30A, and 30B respectively are diagrams for explaining the detection of the line connection in a seventh embodiment of segmenting characters of a document image according to the present invention.

DESCRIPTION OF THE PREFERRED EMBODIMENTS

Figure 2:
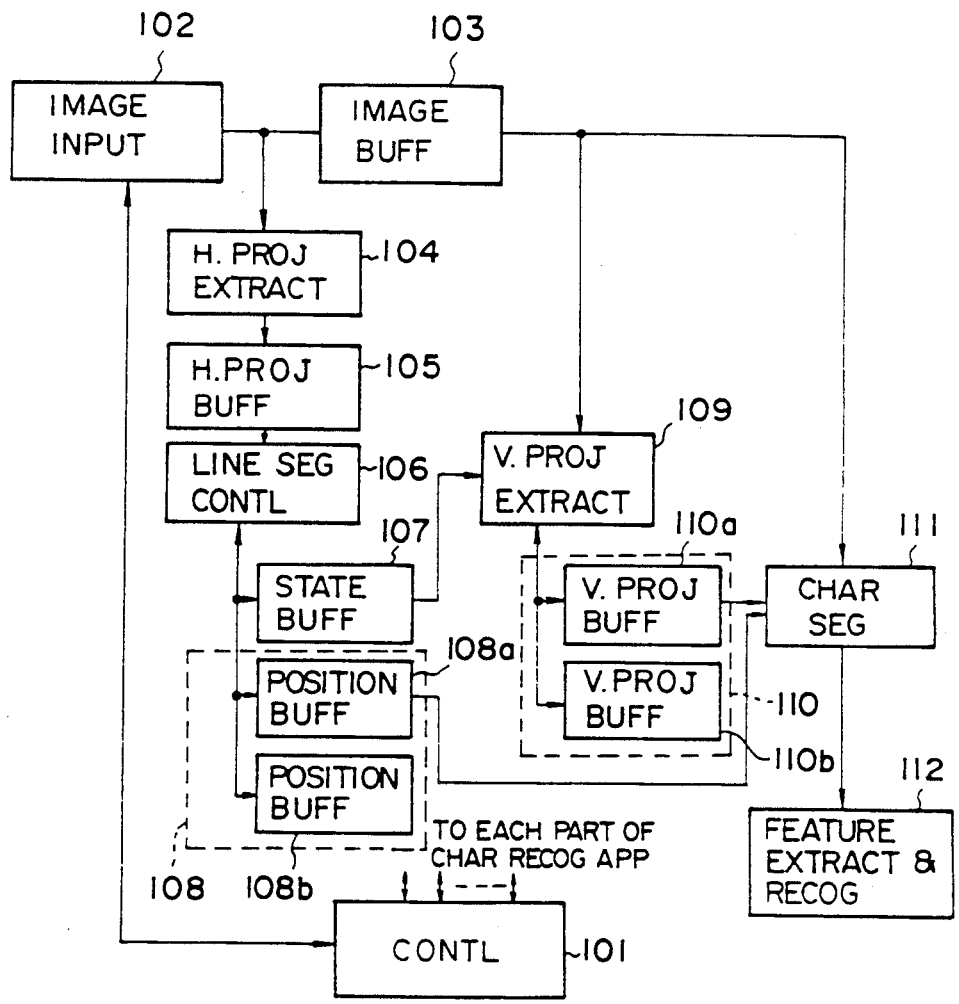
FIG. 2 is a system block diagram showing a character recognition apparatus which is applied with a first embodiment of a method of segmenting characters of a document image according to the present invention.

FIG. 2 shows a character recognition apparatus which is applied with a first embodiment of a method of segmenting characters of a document image according to the present invention. In FIG. 2, a controller 101 controls the entire character recognition apparatus. The illustration of signal lines for supplying control signals from the controller 101 to each part of the character recognition apparatus is omitted in FIG. 2 to simplify the drawing. An image input device 102 is a scanner, an image file and the like for inputting input image data, and an image buffer 103 temporarily stores the input image data. A horizontal projection extracting part 104 extracts the horizontal projections for line segmentation, and a horizontal projection buffer 105 temporarily stores horizontal projection data of each of the divided regions. A line segmentation controller 106 makes a line segmentation from the horizontal projection, and a state buffer 107 temporarily stores the state of the line segmentation (segmentation state) for each of the divided regions. A position buffer 108 temporarily stores start and end positions of the line for each of the divided regions. The position buffer 108 is made up of buffer 108a for the present line and a buffer 108b for the next line. A vertical projection extracting part 109 extracts the vertical projections for segmenting the characters from the line, and a vertical projection buffer 110 temporarily stores vertical projection data. The vertical projection buffer 110 is made up of a buffer 110a for the present line and a buffer 110b for the next line. A character segmentation part 111 finally segments each character image of the present line from the image buffer 103. A feature extraction and recognition part 112 extracts the features of the segmented character image and makes a character recognition.

Figure 3:
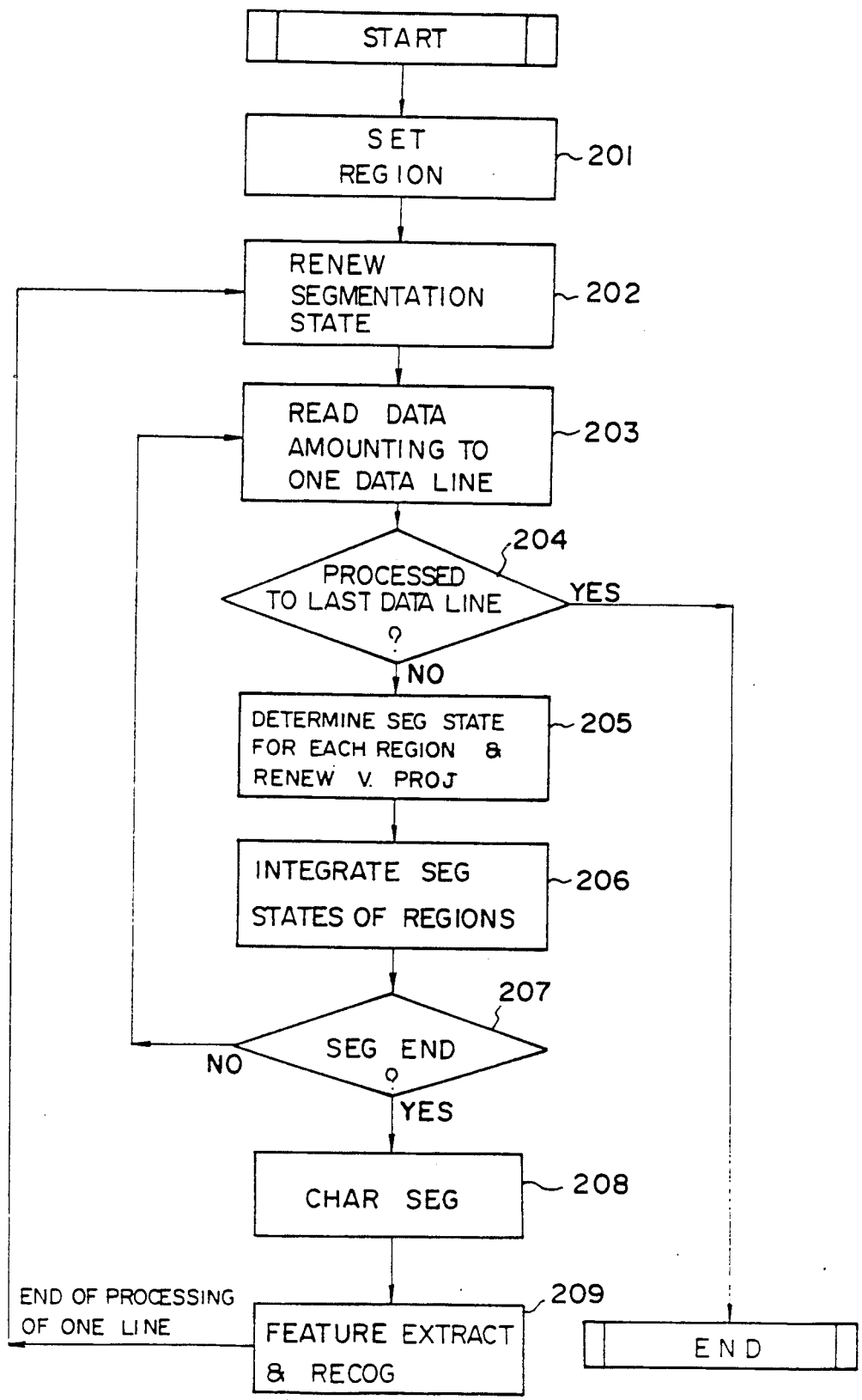
FIG. 3 is a flow chart for explaining a process carried out by the character recognition apparatus shown in FIG. 2.

FIG. 3 shows the first embodiment of the method according to the present invention, that is, a process carried out by the character recognition apparatus under the control of the controller 101 shown in FIG. 2, and a description will hereunder be given of the process step by step. In FIG. 3, steps 202 through 207 relate to the processing which takes one data line of the image as a unit, and steps 208 and 209 relate to the processing which takes one line of character string as a unit.

Figure 4:
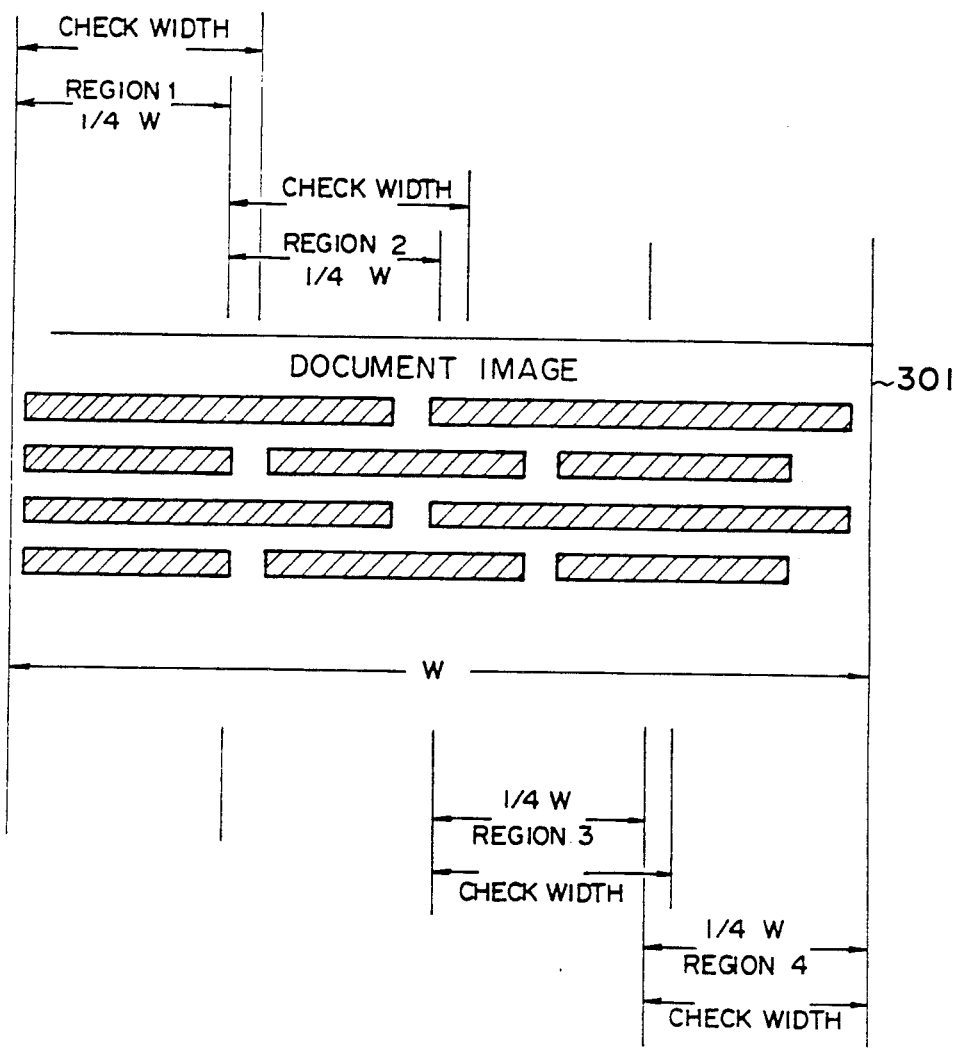
FIG. 4 is a diagram for explaining divided regions and a check width of a document image.

A step 201 sets by the controller 101 a region and a check width before a processing of one page of document image is started. It is assumed that characters are printed (or written) horizontally in the document. As shown in FIG. 4, a document image 301 is equally divided into four regions in the direction of the lines (that is, the horizontal direction), and four divided regions 1 through 4 each having ¼ a width W of the document image 301 are set. A check width which is greater than that of the divided regions 1 through 3 is set for each of the divided regions 1 through 3. The check width is a predetermined value greater than the width of the divided regions 1 through 3, but is equal to the width of the divided region 4 which is located at the right end in FIG. 4 and has no adjacent divided region on the right side thereof.

The number of divided regions and the difference between the check width and the widths of the divided regions may be set arbitrarily depending on the width and the like of the document image 301.

A step 202 carries out by the controller 101 a renewal operation to return the segmentation state of each divided region by one line. At the start of the processing of the document image 301, however, an initial setting is made to set a pointer of the image buffer 103 to the top and to clear the state buffer 107, the horizontal projection buffer 105, the buffers 110a and 110b of the vertical projection buffer 110, and the buffers 108a and 108b of the position buffer 108.

The process carried out by this step 202 after the processing of the document image 301 is started will be given later in the specification.

A step 203 instructs the image input device 102 to enter an input by the controller 101. Thus, an image data amounting to one data line of the document image 301 is input and read into a position indicated by the pointer of the image buffer 103. The input image data is also input to the horizontal projection extracting part 104 and a number of black picture elements within the check width is counted for each of the divided regions. A horizontal projection data which is "1" (or ON) when the counted number of black picture elements is greater than a predetermined threshold value and is "0" (or OFF) when the counted number of black picture elements is less than or equal to the predetermined threshold value is stored in the horizontal projection buffer 105 in correspondence with each of the divided regions. That is, the horizontal projection data is either "1" or "0".

A step 204 discriminates by the controller 101 whether or not the document image 301 is processed to the last data line. When the discrimination result in the step 204 becomes YES, the processing of one page of the document image 301 is completed and the process ends.

On the other hand, when the discrimination result in the step 204 is NO, a step 205 determines by the line segmentation controller 106 the segmentation state for each of the divided regions and also renews by the vertical projection extracting part 109 the contents of the buffers 110a and 110b of the vertical projection buffer 110 based on the results of the determination of the segmentation state.

Figure 5:
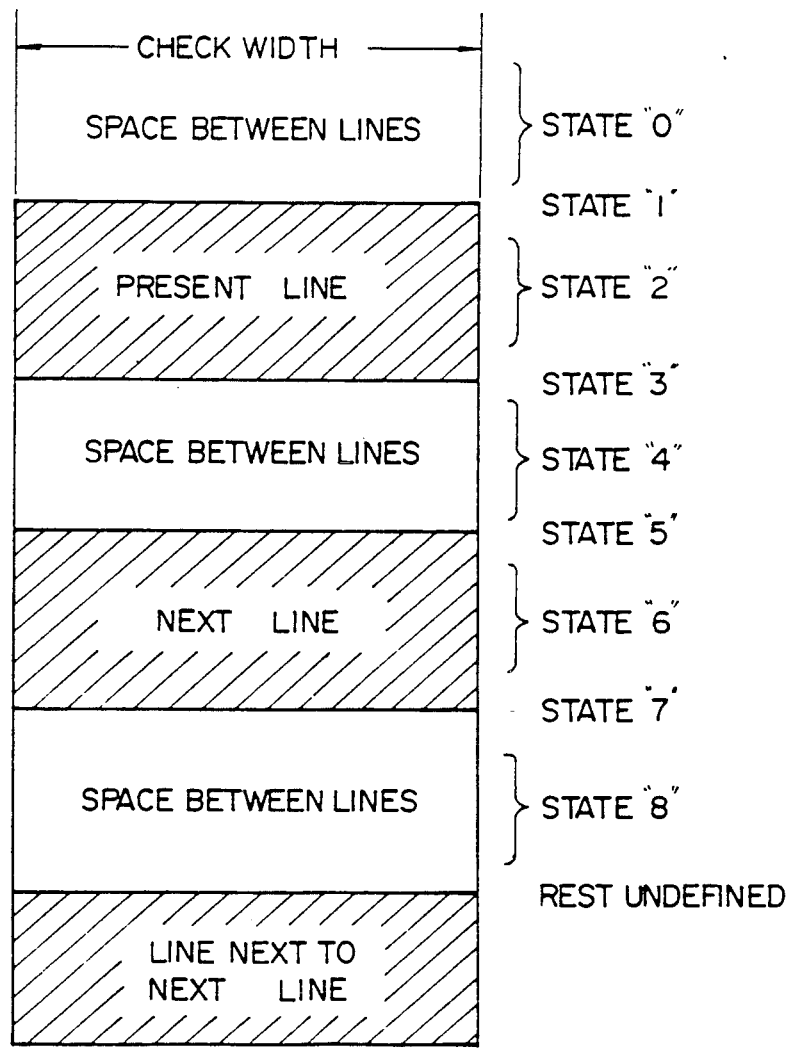
FIG. 5 is a diagram for explaining a segmentation state.

In this embodiment, the line segmentation state may take any of nine segmentation states "0" through "8". FIG. 5 is a diagram for explaining the segmentation state. When the processing is made from the top to bottom of the document image 301 for the check width shown in FIG. 5, the segmentation state undergoes a transition shown. An odd numbered segmentation state corresponds to an intermediate state of the state transition. In order to facilitate the elimination of the unstable segmentation caused by noise and the like, this embodiment also treats the intermediate state as one segmentation state.

The segmentation state is determined as described hereunder depending on whether the horizontal projection data of each divided region related to the input data line and stored within the horizontal projection buffer 105 is ON (line portion) or OFF (space portion between the lines) and depending on the present state, that is, the segmentation state of the immediately preceding data line stored in the state buffer 107.

First, the following state determination is made for the divided region with the horizontal projection which is OFF.

1-1) When the present segmentation state is "0", the segmentation state is determined the same to "0" and no rewriting is made of the state data of the corresponding divided region within the state buffer 107.

1-2) When the present segmentation state is "1", the segmentation state is determined to "0" and the state data within the state buffer 107 is rewritten. As may be seen from FIG. 5, such a transition of the segmentation state is a kind of noise processing because an evaluation as a line portion is cancelled.

1-3) When the present segmentation state is "2", the segmentation state is determined to "2" if a distance between the present processing position (present input data line position) and a line start position stored in the buffer 108 is smaller than a minimum line height, so as to integrate the character which is separated into top and bottom portions into one line. The segmentation state is otherwise determined to "3" and the state data within the state buffer 107 is rewritten. In addition, the present processing position is written into the buffer 108a as a present line end position.

1-4) When the present segmentation state is "3", the segmentation state is determined to "4" and the state data stored in the state buffer 107 is rewritten. First, the segmentation state of an adjacent divided region on the left of the concerned divided region is detected. When the detected segmentation state is "0", the segmentation of the adjacent divided region is changed to "4" and a sign is written into the buffer 108a as a present line start position and a present line end position of the adjacent divided region. This sign indicates that the present line is a blank line. Further, this process is successively repeated towards the divided region on the left of the concerned divided region until the segmentation state is no longer "0" or until the left end is reached. Then, the same process is carried out towards the divided region on the right of the concerned divided region.

Figure 6A:
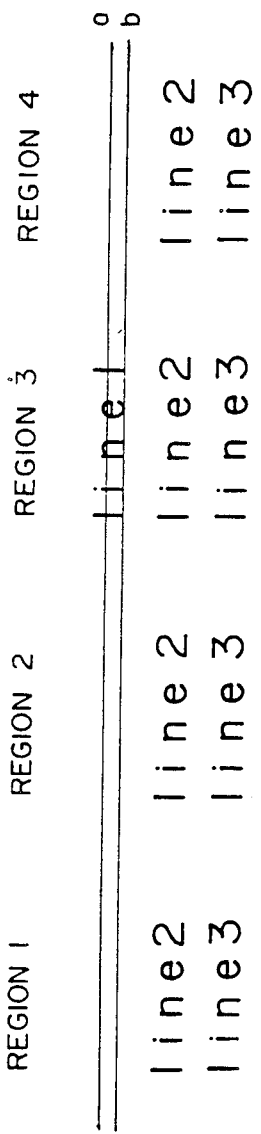
FIGS. 6A through 6C diagrams for explaining a state transition.

An example of this process will now be described in conjunction with FIG. 6A. In FIG. 6A, the segmentation states of the divided regions 1, 2, 3, and 4 respectively are "0", "0", "2", and "0" for a data line a. As the process progresses and the segmentation state of the divided region 3 becomes "3" for the data line a and "4" for a data line b, the segmentation state becomes "4" in the sequence of the divided regions 2, 1 and 4 according to the rule described above under 1-4), and a blank line is registered. In FIG. 6A, the segmentation state becomes "4" for all of the divided regions 1 through 4 and the segmentation is ended.

1-5) When the present segmentation state is "4", the segmentation state is determined to "4".

1-6) When the present segmentation state is "5", the segmentation state is determined to "4". Similarly as in the case described above under 1-2), this process is also a noise processing.

1-7) When the present segmentation state is "6", the segmentation state is determined the same to "6" if a distance between a next line start position stored in the buffer 108b and a present processing position is smaller than the minimum line height. Otherwise, the segmentation state is determined to "7" and the present processing position is written into the buffer 108b as a next line end position. This process is similar to the process described above under 1-3) and also integrates the character which is separated into top and bottom portions into one line.

1-8) When the present segmentation state is "7", the segmentation state is determined to "8". First, the segmentation state of an adjacent divided region on the left of the concerned divided region is detected. When the detected segmentation state is "4", the segmentation of the adjacent divided region is changed to "4" and a sign is written into the buffer 108b as a present line start position and a present line end position of the adjacent divided region. This sign indicates that the present line is a blank line. Further, this process is successively repeated towards the divided region on the left of the concerned divided region until the segmentation state is no longer "4" or until the left end is reached. Then, the same process is carried out towards the divided region on the right of the concerned divided region.

Figure 6B:
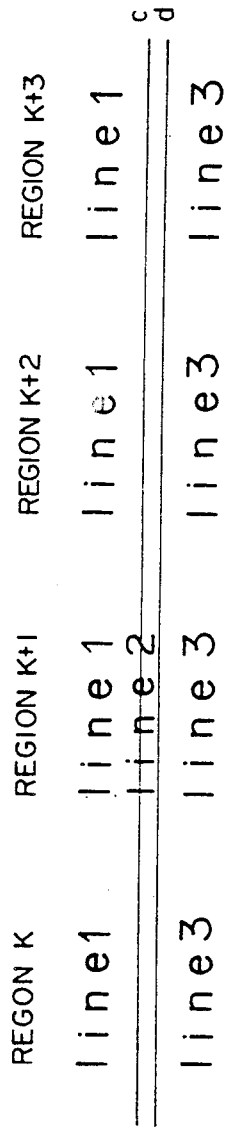
Figure 6C:
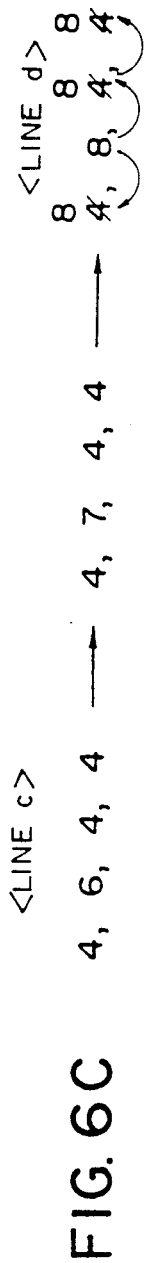

An example of this process will now be described in conjunction with FIGS. 6B and 6C. A state shown in FIG. 6B in which the segmentation states of the divided regions differ will not occur unless there remains a divided region which does not yet satisfy the condition for ending the segmentation. Hence, the segmentation states shown in FIG. 5C are obtained for data lines c and d shown in FIG. 5B.

1-9) When the present segmentation state is "9", the segmentation state is determined to "8".

On the other hand, the following state determination is made for the divided region with the horizontal projection which is ON.

1-10) When the present segmentation state is "0", the segmentation state is determined to "1" and the present processing position is written into the buffer 108a as the present line start position.

1-11) When the present segmentation state is "1", the segmentation state is determined to "2".

1-12) When the present segmentation state is "2", the segmentation state is determined the same to "2".

1-13) When the present segmentation state is "3", the segmentation state is determined to "2" (noise processing).

1-14) When the present segmentation state is "4", the segmentation state is determined to "5" and the present processing position is written into the buffer 108b as the next line start position of the divided region.

1-15) When the present segmentation state is "5", the segmentation state is determined to "6".

1-16) When the present segmentation state is "6", the segmentation state is determined the same to "6".

1-17) When the present segmentation state is "7", the segmentation state is determined to "6" (noise processing).

1-18) When the present segmentation state is "8", the line segmentation controller 106 discriminates that the inclination (skew) of the document image 301 is excessively large and informs this to the controller 101. In this case, the controller 101 stops the process.

After the determination of the segmentation state described above, the vertical projection extracting part 109 renews the content of the vertical projection buffer 110 for each of the divided regions according to the image data of the present input data line input from the image buffer 103. That is, the segmentation state of each of the divided regions is detected from the state data stored in the state buffer 107, and with respect to the divided region with the segmentation state "2", a value "1" is added to the value of each picture element position of the buffer 110a if the corresponding picture element of the present input data line is black. On the other hand, with respect to the divided region with the segmentation state "6", a value is added similarly to the value of each picture element position of the buffer 110b. No renewal is made with respect to the divided region with a segmentation state other than "1" and "6".

Therefore, the vertical projections are extracted not only for the present line but also for the next line in parallel to the line segmentation.

When the renewal of the vertical projections is ended, the process advances to a next step 205. However, the process ends in the case described above under 1-18).

A step 206 integrates by the controller 101 the segmentation states of the divided regions. The step 206 refers to the content of the state buffer 107 and discriminates the conditions by the following processes 1-a) through 1-d) in this sequence and carries out a process dependent on the discrimination result. The process is ended at the stage when the conditions stand.

1-a) When the segmentation state of all of the divided regions is "0", it is discriminated that the segmentation is not ended and data of the present input data line is destroyed. In other words, the data of the input data line is destroyed by not incrementing the pointer of the image buffer 103 and writing the image data of the next data line at the same position over the data of the input data line.

1-b) When there exists at least one divided region with an odd numbered segmentation state selected from "1", "3", "5" and "7", it is discriminated that the segmentation is not ended and the data of the present input data line is maintained. In other words, the data of the present input data line is maintained by incrementing the pointer of the image buffer 103 by one data line.

1-c) When the segmentation state of all of the divided regions is any one of "4", "6" and "8", it is discriminated that the segmentation is ended and the data of the present input data line is maintained. In other words, the data of the present input data line is maintained by incrementing the pointer of the image buffer 103 by one data line.

1-d) When the segmentation state does not fall in any of the conditions set forth above in 1-a) through 1-c), it is discriminated that the segmentation is not ended and the data of the present input data line is maintained. In other words, the data of the present input data line is maintained by incrementing the pointer of the image buffer 103 by one data line.

A step 207 discriminates by the controller 101 whether or not the segmentation is ended. Hence, when the step 206 discriminates that the segmentation is not ended and the discrimination result in the step 207 is NO, the process returns to the step 203 which inputs the data of the next data line. On the other hand, when the step 206 discriminates that the segmentation is ended and the discrimination result in the step 207 is YES, the process advances to a next step 208.

A step 208 makes a character segmentation by the character segmentation part 111. When the character segmentation part 111 is activated by the controller 101, the character segmentation part 111 refers to the contents of the buffers 110a and 108a and determines the range of the character segmentation as will be described later, and segments the image of each character in the present line from the input image data stored in the image buffer 103.

The range of the character segmentation is determined as follows. A character portion and a blank portion are separated by comparing the vertical projections with a threshold value, and start and end positions of the character portion (left and right end positions in this case because the characters are printed horizontally) are respectively set as a start position (left end) and an end position (right end) of the range of the character segmentation in the direction of the lines. In addition, a line start position and a line end position of the divided region on a predetermined side (left side in this case because the characters are printed horizontally) are always set as a start position (top end) and an end position (bottom end) of the range of the character segmentation in a direction perpendicular to the lines.

A step 209 makes a feature extraction and character recognition of the segmented character image by the feature extraction and recognition part 112, similarly as in the case of the conventional character recognition apparatus. When the process is completed for all of the characters in the present line, the process returns to the step 202 and the controller 101 renews the segmentation state.

Next, a more detailed description will be given of the process carried out by the step 202 after the process is started. When the process returns from the step 209 to the step 202, the segmentation state is limited to one of "4", "6" and "8".

1-i) First, a reference is made to the state data stored in the state buffer 107. When the segmentation state of all of the divided regions is "4", the image of the next line does not exist in the horizontal projection buffer 105, as may be seen from FIG. 5. Hence, the horizontal projection buffer 105, the buffers 110a and 110b, and the buffers 108a and 108b are cleared similarly as in the case of the initial setting, and the pointer of the image buffer 103 is set to the top. The process advances to the next step 203 and otherwise advances to the process described below under 1-ii).

1-ii) In this case, the characters are printed (or written) horizontally in the document image 301 and the position of the line is described on a scale which increases from the top to bottom of the document image 301. Hence, a search is made for a smallest (uppermost) line start position by comparing the line start positions of each of the divided regions within the buffer 108b. The image data of the image buffer 103 is shifted by an amount corresponding to the smallest line start position. That is, the image of the next line is shifted to the top in the image buffer 103, and the pointer of the image buffer 103 is decremented by the amount of the shift. If the actual document image is read in parts as it is, the upper end portion which is blank is read. For this reason, the blank upper end portion is omitted and the image is shifted to the top by the amount of the omitted portion. As a result, the horizontal projection data is ON in at least one of the divided regions at the upper end of the document image.

Next, the next line up to that point in time becomes the present line. Hence, the content of the buffer 110b is copied into the buffer 110a and the buffer 110b is cleared. It is of course possible to switch the buffers 110a and 110b and use the buffer 110a for the next line and the buffer 110b for the present line instead of copying the content of the buffer 110b.

Then, the following renewal process is carried out with respect to each of the divided regions.

With respect to the divided region with the segmentation state "4" the state of the state buffer 107 is rewritten to "0".

With respect to the divided region with the segmentation state "6", the state of the state buffer 107 is rewritten to "2". In addition, a value which is obtained by subtracting the amount of shift in the image buffer 103 from the line start position of the divided region stored in the buffer 108b is written into the buffer 108a as the present line start position of the divided region.

With respect to the divided region with the segmentation state "8", the state of the state buffer 107 is rewritten to "4". In addition, values which are obtained by subtracting the amount of shift in the image buffer 103 from the line start position and the line end position of the divided region stored in the buffer 108b are respectively written into the buffer 108a as the present line start position and the present line end position of the divided region.

After the above described process, the process returns to the step 203.

Figure 7:
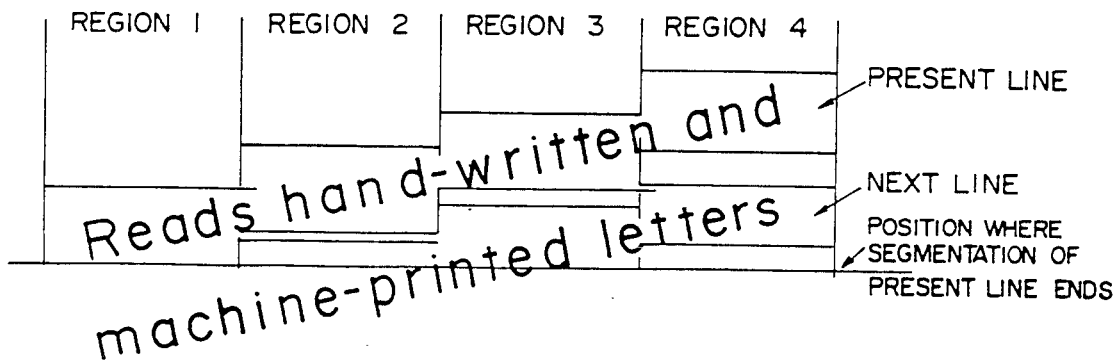
FIG. 7 is a diagram for explaining a line segmentation.

FIG. 7 shows an example of the line segmentation. In this example, the horizontal projection turns ON in the sequence of the divided regions 4, 3, 2, and 1 for the present line. In a stage where the divided region 1 detects the present line and the segmentation state becomes "4", the segmentation of the present line is ended. At this stage, the divided regions 2 and 3 have the segmentation state "6" and the divided region 4 has the segmentation state "8". In addition, the extraction of the vertical projections of the next line is finished with respect to the divided region 4.

According to the first embodiment, the segmentation can be made easily and positively even when the character exists at a boundary between two divided regions. The advantageous effects of this embodiment will now be described with reference to FIG. 8.

Figure 1:
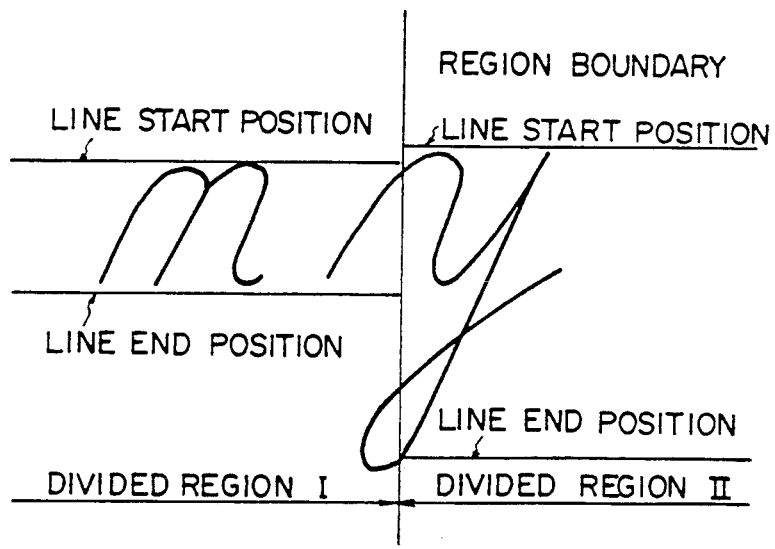
FIG. 1 is a diagram for explaining a conventional method of segmenting a character which is located at a boundary between two divided regions.
Figure 8:
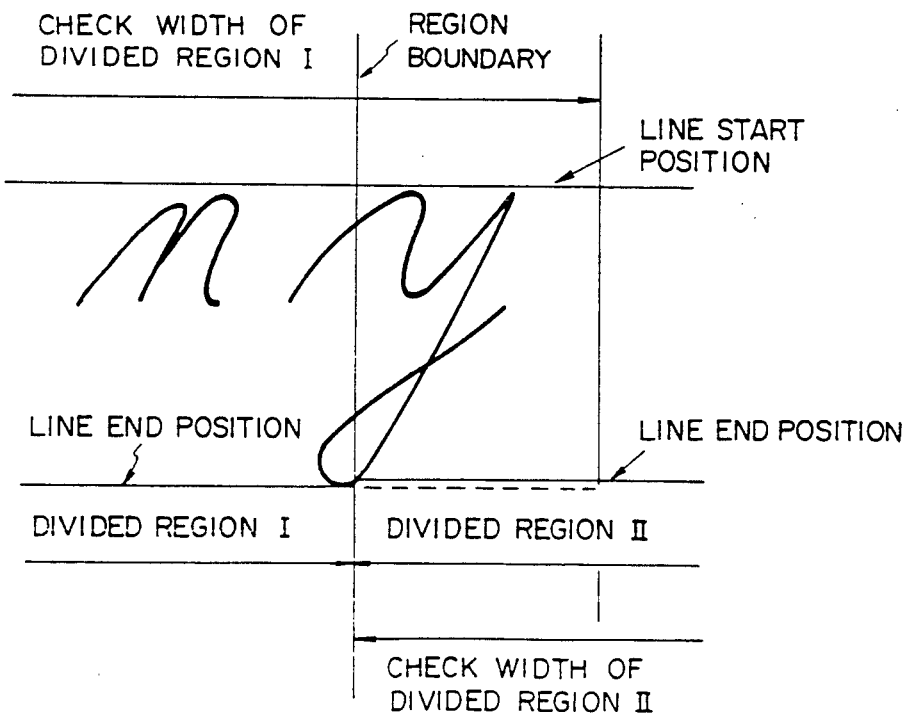
FIG. 8 is a diagram for explaining a segmenting of a character which is located at a boundary between two divided regions in the first embodiment.

FIG. 8 is a diagram for explaining the segmentation with respect to the same divided regions as FIG. 1. In FIG. 8, the line start position and the line end position become as shown because the horizontal projections for the line segmentation in the divided region I are detected for the check width including a portion of the divided region II. In other words, the line in the divided region I is segmented with a width including approximately the entire character "y" at the boundary, and the top end and the bottom end of the range of the segmentation of the character "y" are respectively used as the line start position and the line end position of the line segmentation in the divided region I. Hence, it is possible to correctly segment essentially the entire character "y" at the boundary. As a result, a segmentation error will not occur even when the character segmentation is made with respect to the character at the boundary between two divided regions, and the reliability and processing speed of the segmentation are improved because no complex and special processing is required as in the conventional case.

On the other hand, this embodiment writes the segmentation state for each divided region. For this reason, the writing of the line segmentation state as a whole is simple, and the renewal of the segmentation state after a segmentation of a line is simple. Furthermore, by treating the intermediate state of the state transition as one segmentation state, it is possible to eliminate the instability of the line segmentation caused by the noise and the character which is separated into top and bottom portions. It is also possible to easily detect the continuity of the line in the adjacent divided regions solely from the segmentation state of each divided region.

The system of generating the vertical projections of the present line in the process of the line segmentation is known. However, the setting and automatic switching of the buffers for the present line and the next line and the omission of the calculation of the projections by use of the segmentation states of the divided regions as done in this embodiment are not known. Since this embodiment effectively generates the vertical projections for the character segmentation and automatically switches the vertical projections, it is possible to omit the reprocessing of the read image data and the back-tracking. Accordingly, this embodiment also contributes to the simplification of renewing the segmentation state after the segmentation.

Figure 9:
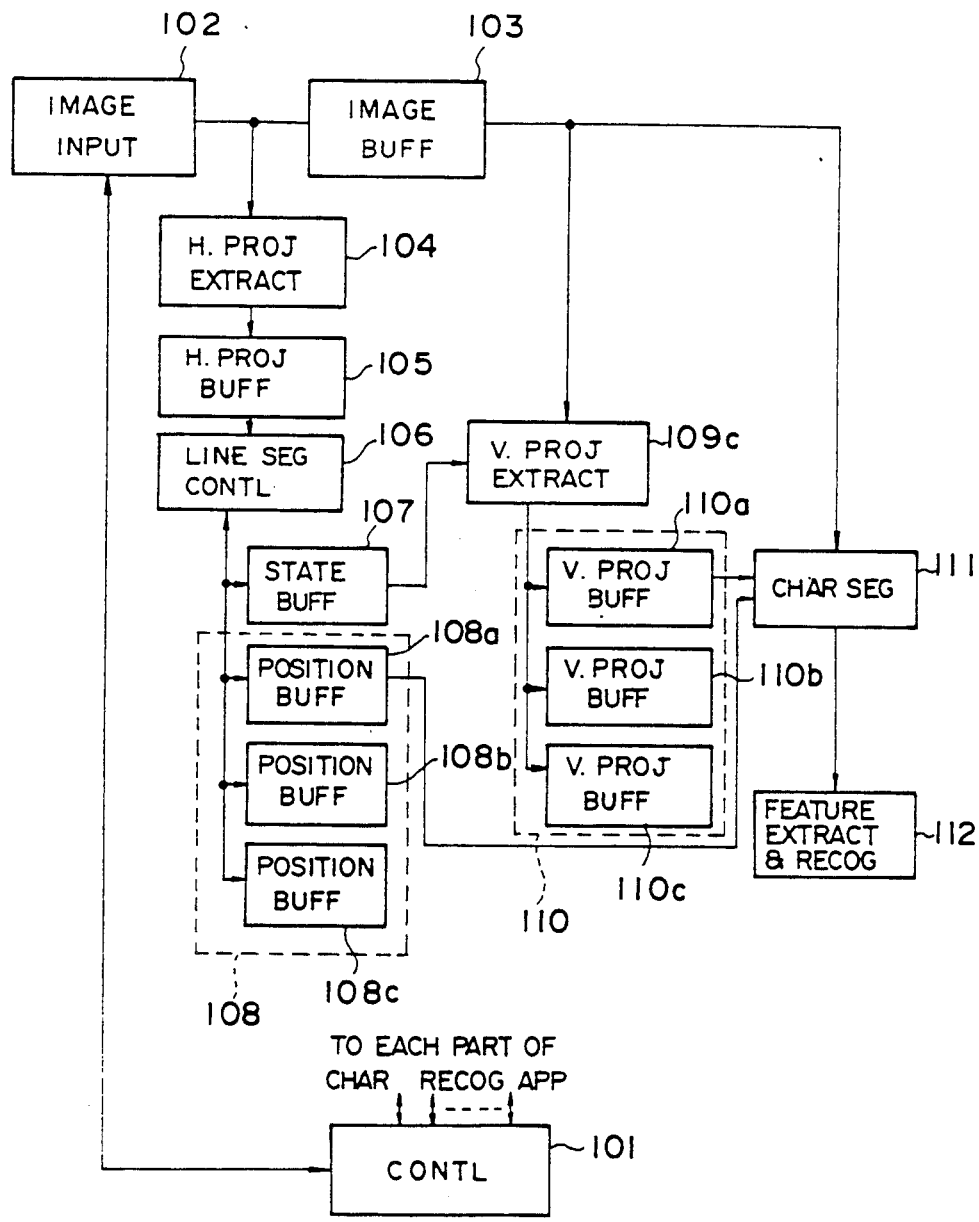
FIG. 9 is a system block diagram showing a character recognition apparatus which is applied with a second embodiment of a method of segmenting characters of a document image according to the present invention.

Next, a description will be given of a second embodiment of the method of segmenting characters of a document image according to the present invention. FIG. 9 shows a character recognition apparatus which is applied with the second embodiment of the method of segmenting characters of a document image according to the present invention. In FIG. 9, those parts which are substantially the same as those corresponding parts in FIG. 2 are designated by the same reference numerals, and a description thereof will be omitted.

The character recognition apparatus shown in FIG. 9 differs from that shown in FIG. 2 in that the position buffer 108 and the vertical projection buffer 110 are respectively made up of three buffers. In other words, the position buffer 108 for temporarily storing the line start position and the line end position for each divided region includes a buffer 108a for the present line, a buffer 108b for the next line, and a buffer 108c for a line next to the next line (that is, for a line after next). Similarly, the vertical projection buffer 110 for temporarily storing the vertical projections includes a buffer 110a for the present line, a buffer 110b for the next line, and a buffer 110c for the line next to the next line (that is, for a line after next).

Figure 10:
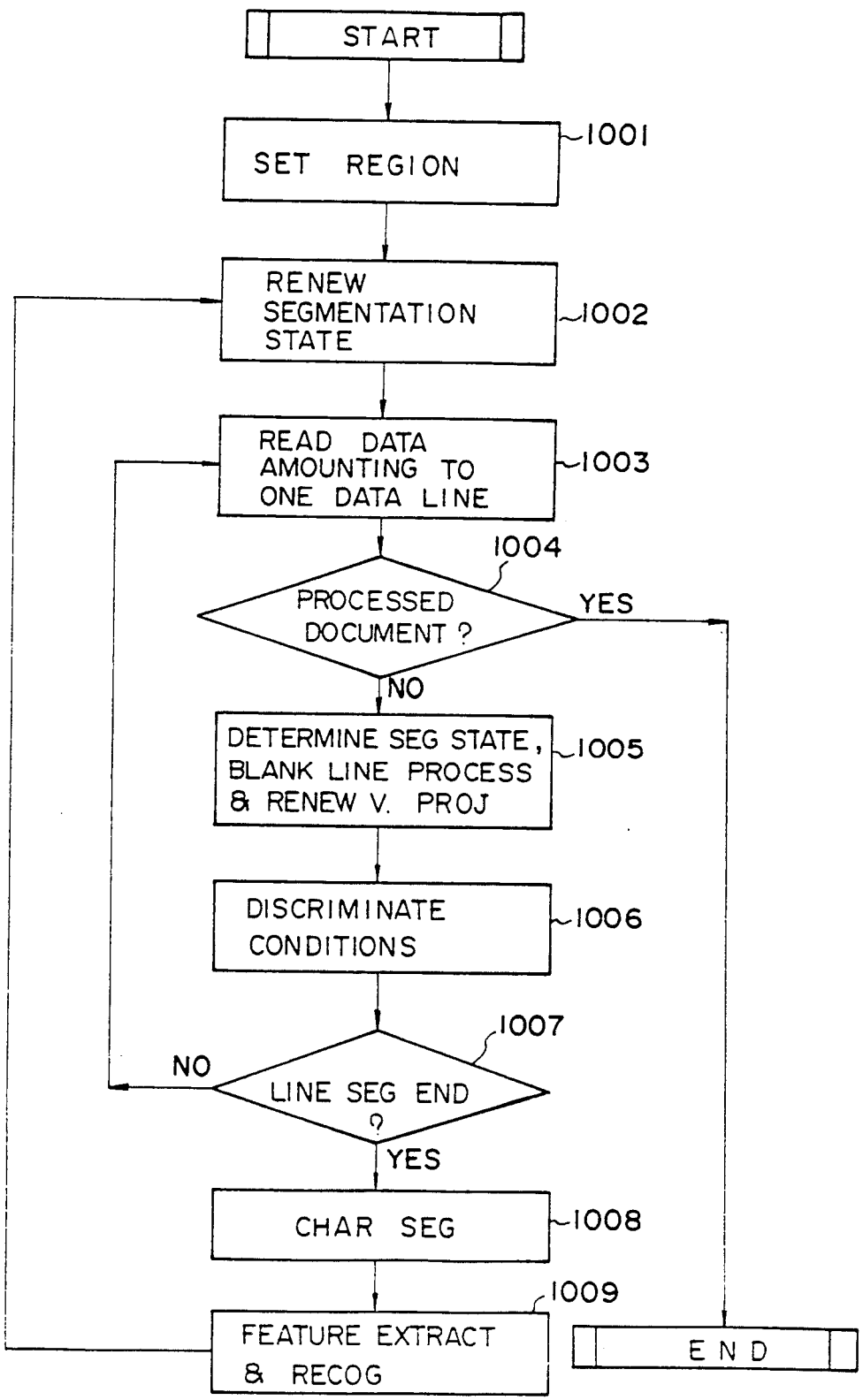
FIG. 10 is a flow chart for explaining a process carried out by the character recognition apparatus shown in FIG. 9.

FIG. 10 shows the second embodiment of the method according to the present invention, that is, a process carried out by the character recognition apparatus shown in FIG. 9, and a description will hereunder be given of the process step by step. In FIG. 10, steps 1002 through 1006 relate to the processing which takes one data line of the image as a unit, and steps 1008 and 1009 relate to the processing which takes one line of character string as a unit.

A step 1001 sets by the controller 101 a region and a check width before a processing of one page of document image is started, and is substantially the same as the step 201 shown in FIG. 2. It is assumed that characters are printed (or written) horizontally in the document. As shown in FIG. 4, the document image 301 is equally divided into four regions in the direction of the lines (that is, the horizontal direction), and the four divided regions 1 through 4 each having ¼ the width W of the document image 301 are set. The check width which is greater than that of the divided regions 1 through 3 is set for each of the divided regions 1 through 3. The check width is a predetermined value greater than the width of the divided regions 1 through 3, but is equal to the width of the divided region 4 which is located at the right end in FIG. 4 and has no adjacent divided region on the right side thereof.

The number of divided regions and the difference between the check width and the widths of the divided regions may be set arbitrarily depending on the width and the like of the document image 301.

A step 1002 carries out by the controller 101 a renewal operation to return the segmentation state of each divided region by one line. At the start of the processing of the document image 301, however, an initial setting is made to set a pointer of the image buffer 103 to the top and to clear the state buffer 107, the horizontal projection buffer 105, the buffers 110a, 110b and 110c of the vertical projection buffer 110, and the buffers 108a, 108b and 108c of the position buffer 108.

The process carried out by this step 1002 after the processing of the document image 301 is started is different from that of the step 202 shown in FIG. 3, and a description thereof will be given later in the specification.

A step 1003 instructs the image input device 102 to enter an input by the controller 101. Hence, an image data amounting to one data line of the document image 301 is input and read into a position indicated by the pointer of the image buffer 103, and is substantially the same as the step 203 shown in FIG. 3. The input image data is also input to the horizontal projection extracting part 104 and a number of black picture elements within the check width is counted for each of the divided regions. A horizontal projection data which is "1" (or ON) when the counted number of black picture elements is greater than a predetermined threshold value and is "0" (or OFF) when the counted number of black picture elements is less than or equal to the predetermined threshold value is stored in the horizontal projection buffer 105 in correspondence with each of the divided regions. That is, the horizontal projection data is either "1" or "0".

A step 1004 discriminates by the controller 101 whether or not the processing of the document image 301 is completed. When the discrimination result in the step 1004 becomes YES, the processing of one page of the document image 301 is completed and the process ends. Basically, it is possible to discriminate the completion of the processing of the document 301 when the processing is made to the lower end, that is, the last data line of the document image 301. However, in a case where a line of characters is touching the lower end of the document image 301, the processing of the document image 301 is ended without segmenting the line of characters if this simple method of discriminating the completion of the processing of the document image 301 is employed.

For this reason, this embodiment takes the following measures. In other words, when the processing reaches the lower end of the document image 301 while segmenting the character string, it is assumed that a blank data line is read, that is, a process is carried out in which the horizontal projection data of all of the divided regions are set to OFF, and the discrimination to determine the completion of the processing of the document image 301 is deferred until the segmentation of the last character string is ended.

On the other hand, when the discrimination result in the step 1004 is NO, a step 1005 determines by the line segmentation controller 106 the segmentation state for each of the divided regions and also renews by the vertical projection extracting part 109 the contents of the buffers 110a, 110b and 110c of the vertical projection buffer 110 based on the results of the determination of the segmentation state.

Figure 11:
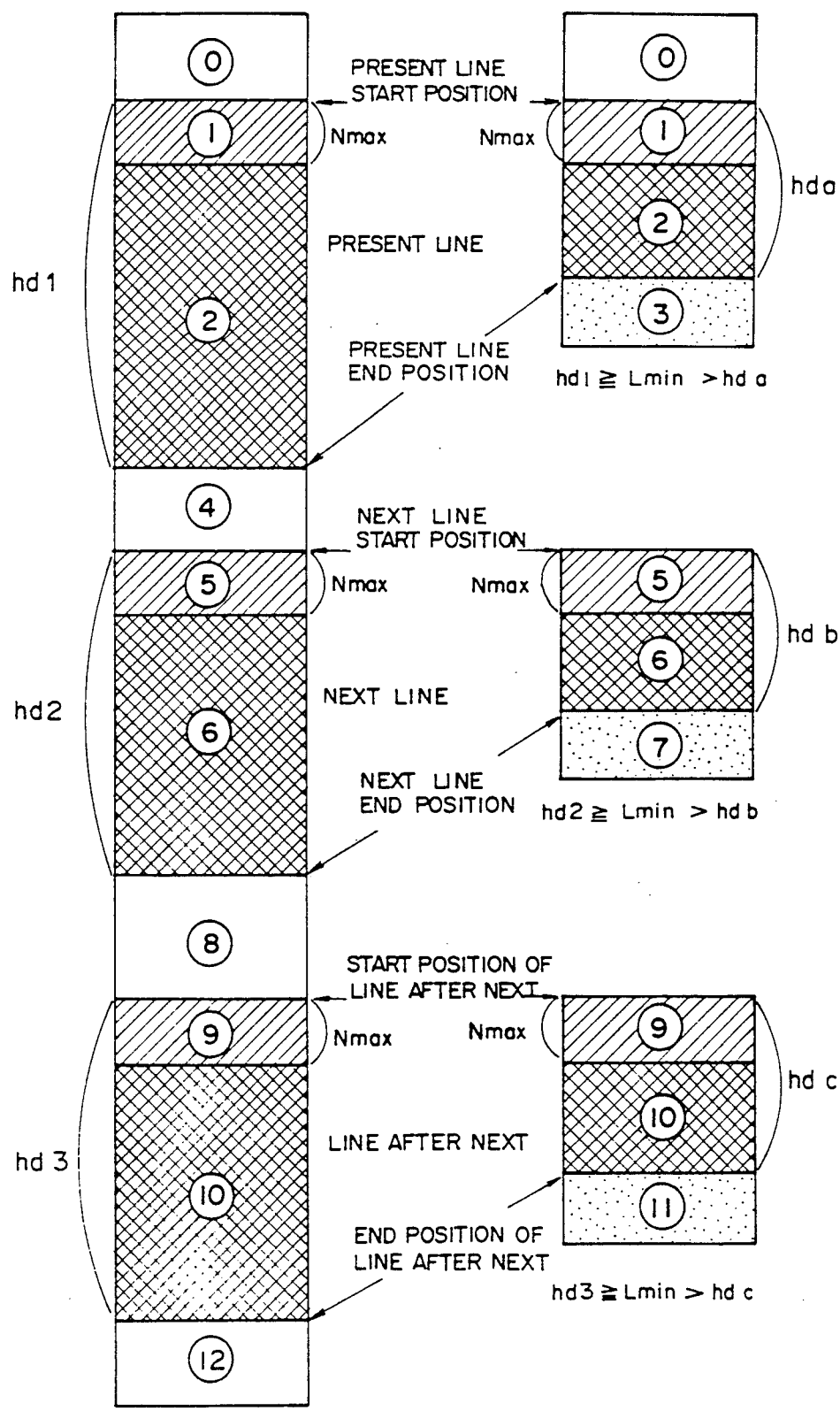
FIG. 11 is a diagram for explaining divided regions of a document image.

In this embodiment, the line segmentation state may take any of thirteen segmentation states "0" through "12". It is of course possible to reduce the number of segmentation states to nine, for example. FIG. 11 is a diagram for explaining the segmentation state. When the processing is made from the top to bottom of the document image 301 in FIG. 11, the segmentation state undergoes a transition shown. The left portion of FIG. 11 shows a typical state transition when no noise exists and the line height is within a reference range. In such a typical state transition, the segmentation states "3", "7", and "11" do not appear. On the other hand, the right portion of FIG. 11 shows a case where the segmentation states "3", "7", and "11" appear. In FIG. 11, hd1 and hda respectively denote the distance between the present line start position and the present line end position, hd2 and hdb respectively denote the distance between the next line start position and the next line end position, and hd3 and hdc respectively denote the distance between the start position of the line after next and the end position of the line after next.

The segmentation state "0" is a state of a section in which the horizontal projection data before the present line is OFF. The segmentation state of a section after the present line appears (after the horizontal projection data changes from OFF to ON) to a number of lines corresponding to a maximum noise height $N_{max}$ is "1". The segmentation state of a section of the blank line after the present line which has a height greater than or equal to a minimum line height $L_{min}$ is "4". The segmentation state which appears at the end of the present line when the height of the present line is less than the minimum line height $L_{min}$ is "3". The segmentation state "3" is not a transition period for shifting to the segmentation state "4", but is a state for indicating that the height of the segmented line is insufficient and there is a possibility that the line is separated. In addition, the segmentation state "4" is a state for indicating that one line is positively segmented because the segmented line has a sufficient height. It is possible for the segmentation state to shift from "2" to "4" without via the segmentation state "4".

The segmentation states "5", "6", "7", and "8" are respectively related to the next line and correspond to the segmentation states "1", "2", "3", and "4". Similarly, the segmentation states "9", "10", "11", and "12" are respectively related to the line next to the next line and correspond to the segmentation states "1", "2", "3", and "4".

Next, a more detailed description will be given of the method of determining the segmentation state. The segmentation state is determined as described hereunder depending on the present state, that is, the segmentation state of the immediately preceding data line stored in the state buffer 107, depending on whether the horizontal projection data of each divided region related to the input data line and stored within the horizontal projection buffer 105 is ON (line portion) or OFF (space portion between the lines), and depending on the height of the line of characters (present line) in which the segmentation is presently made. In the following description, the determination (transition) of the segmentation state will be described sequentially for the cases where the present segmentation state is "0", "1", "2", "3", and "4". However, a description related to the segmentation states "5" through "12" related to the next line and the line next to the next line will be omitted because segmentation states "5" through "12" can be determined similarly to the present line by simply replacing the present line by the next line or the line next to the next line.

Figures 12A, 12B:
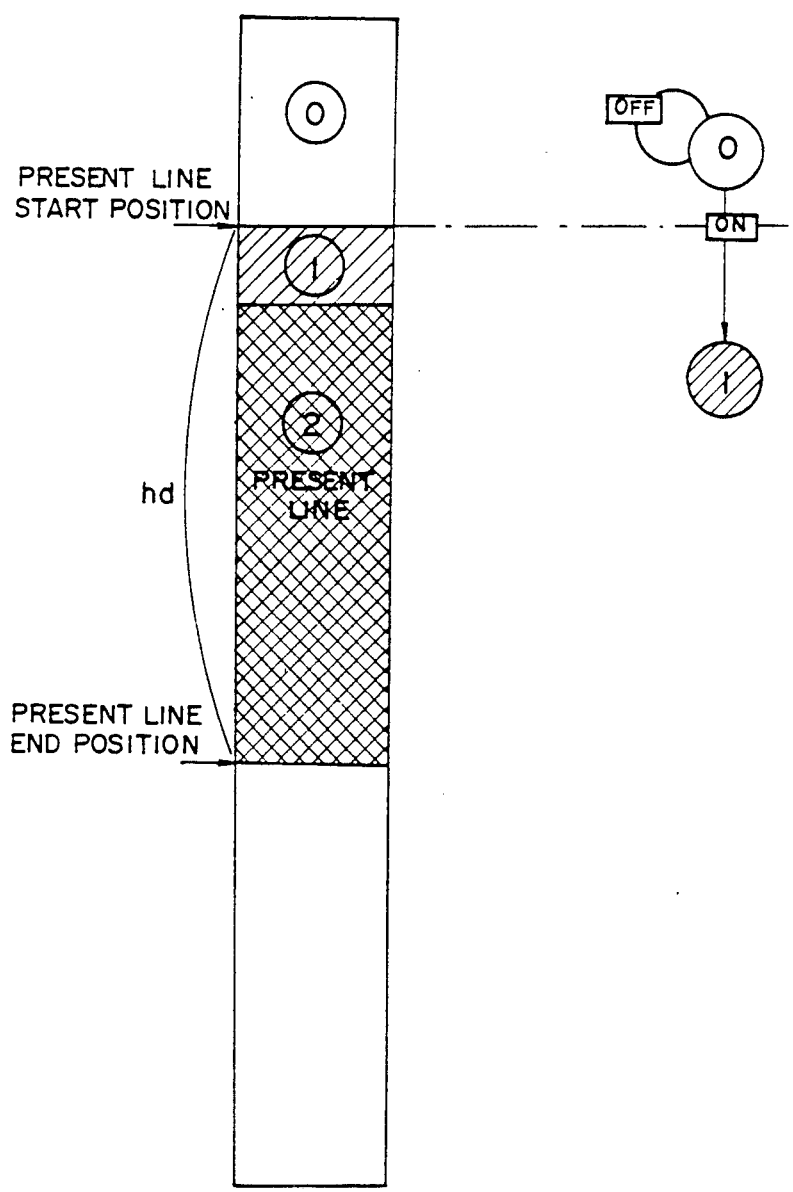
FIGS. 12A and 12B respectively are diagrams for explaining a segmentation state "0" and a determination process thereof.

2-1) When the present segmentation state is "0" as shown in FIG. 12A, the segmentation state is determined to "1" as shown in FIG. 12B and the data line position at this point in time is registered in the buffer 108a as the present line start position when the horizontal projection is ON. On the other hand, the segmentation state is determined the same to "0" as shown in FIG. 12B when the horizontal projection is OFF.

Figures 13A, 13B:
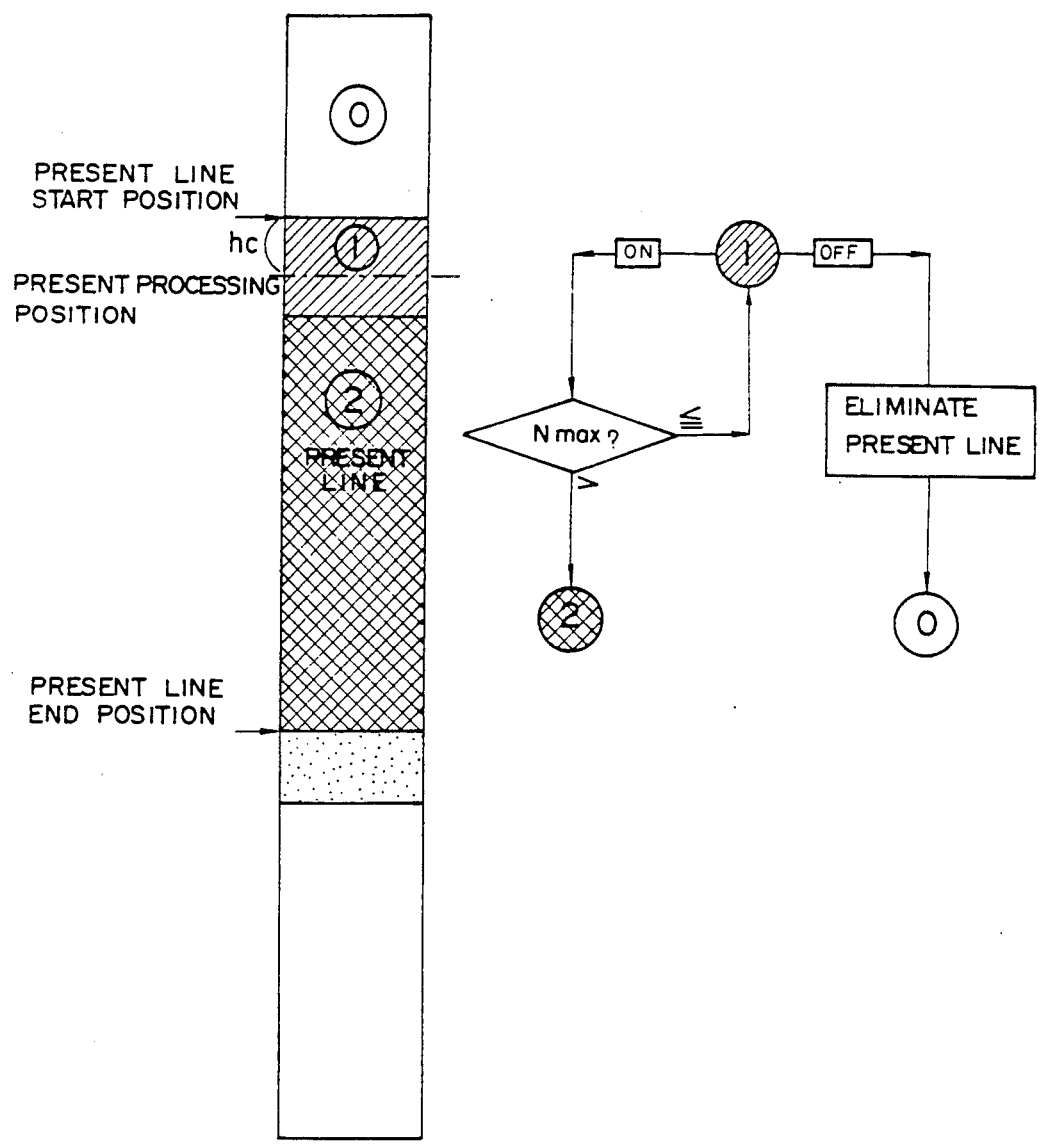
FIGS. 13A and 13B respectively are diagrams for explaining a segmentation state "1" and a determination process thereof.

2-2) When the present segmentation state is "1" as shown in FIG. 13A, the segmentation state is determined to "2" as shown in FIG. 13B if a distance hc between the present line start position and a present processing position is greater than the maximum noise height $N_{max}$ when the horizontal projection is ON. On the other hand, the present line is eliminated as noise and the segmentation state is returned to "0" as shown in FIG. 13B when the horizontal projection is OFF. The present line may be eliminated by deleting the present line start position from the buffer 108a and clearing the vertical projection data of the concerned divided region stored in the buffer 110a.

Figure 14A:
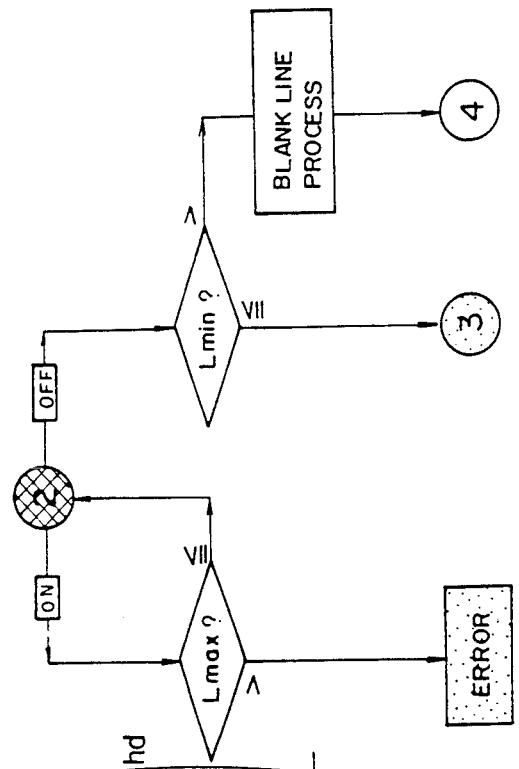
FIGS. 14A and 14B respectively are diagrams for explaining a segmentation state "2" and a determination process thereof.
Figure 14B:
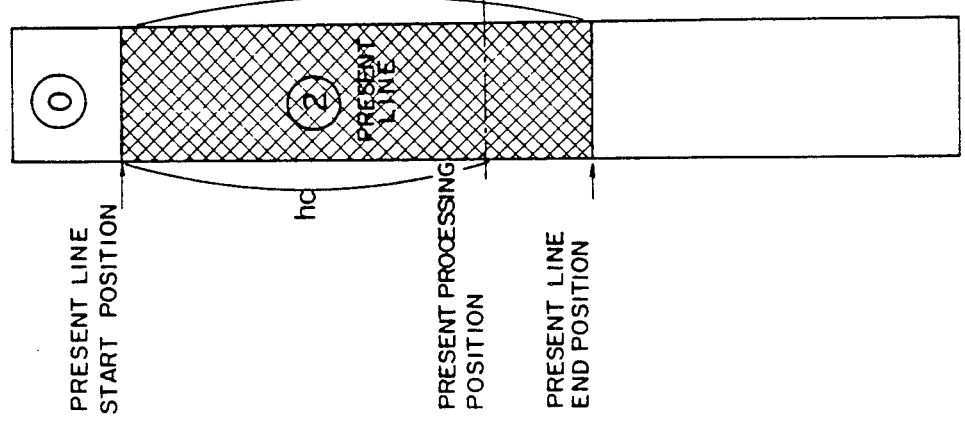

2-3) When the present segmentation state is "2" as shown in FIG. 14A and the horizontal projection is ON, the segmentation state is determined to "2" as shown in FIG. 14B if the distance hc between the present line start position and the present processing position is less than or equal to a maximum line height $L_{max}$. Otherwise, that is, when the distance hc is greater than the maximum line height $L_{max}$, it is discriminated that the line height is too large and an error processing such as a skip reading is carried out. In this case, the entire segmentation is ended due to the error. On the other hand, when the horizontal projection is OFF, the segmentation state is determined to "4" as shown in FIG. 14B by carrying out a blank line process which will be described later with respect to the present line if a distance hd between the present line start position and the present line end position exceeds a minimum line height $L_{min}$. At the present data line, the position one data line before the present processing data line is registered in the buffer 108a as the present line end position. Otherwise, that is, when the distance hd is less than or equal to the minimum line height $L_{min}$, the segmentation state is determined to "3" as shown in FIG. 14B.

The document image is segmented from the top to bottom, and the reading of the image is skipped in the downward direction when the error is generated. The condition for ending the skip reading is that the horizontal projection data are all OFF for one data line. Then, the segmentation state is initialized and the segmentation is continued. In other words, the skip reading skips to a position where a space between the lines is clearly detectable, and the segmentation is newly started therefrom.

Figure 15A:
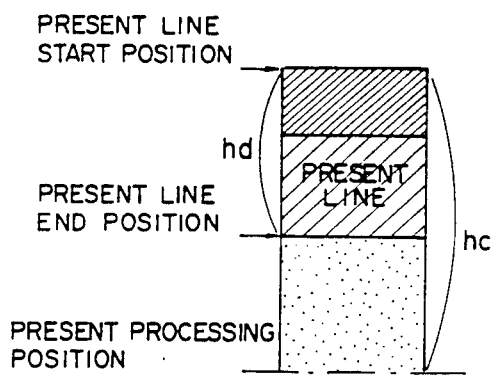
FIGS. 15A through 15D respectively are diagrams for explaining a segmentation state "3" and a determination process thereof.
Figure 15B:
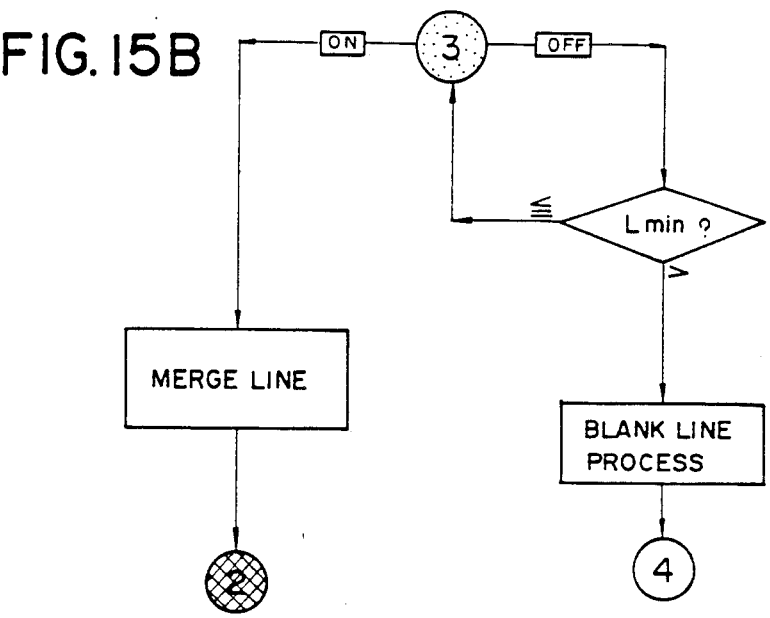
Figure 15C:
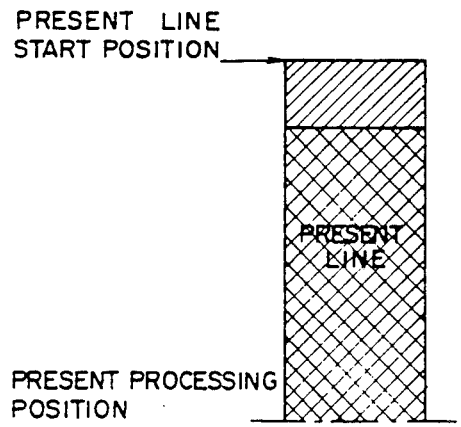
Figure 15D:
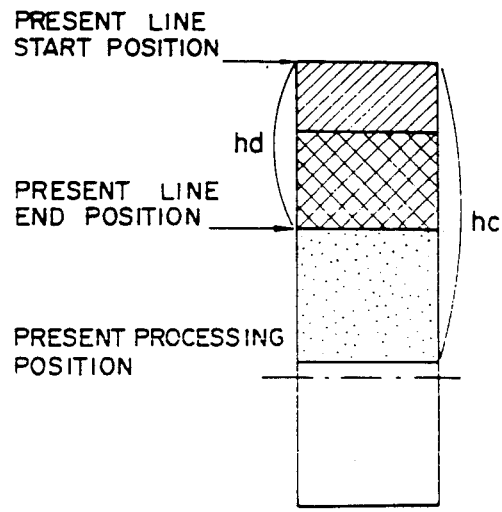

2-4) When the present segmentation state is "3" as shown in FIG. 15A and the horizontal projection is ON, the segmentation state is returned to "2" as shown in FIG. 15B, so as to merge the line which is separated in the horizontal projection into one line as shown in FIG. 15C. On the other hand, when the horizontal projection is OFF and the distance hc between the present line start position and the present processing position is greater than the minimum line height $L_{min}$, the segmentation state is determined to "4" as shown in FIG. 15B by carrying out the blank line process with respect to the present line. Otherwise, that is, when the distance hc is less than or equal to the minimum line height $L_{min}$ as shown in FIG. 15D, the segmentation state is determined the same to "3" as shown in FIG. 15B.

Figures 16A, 16B:
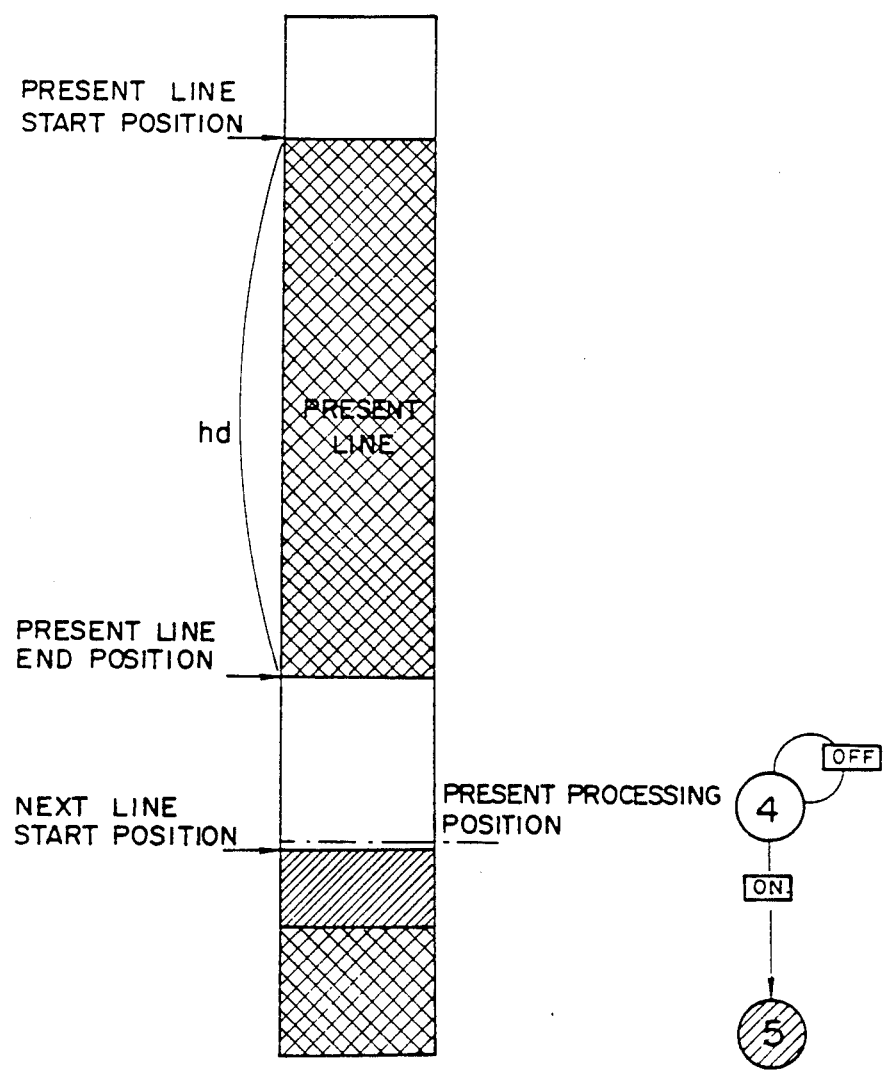
FIGS. 16A and 16B respectively are diagrams for explaining a segmentation state "4" and a determination process thereof.

2-5) When the present segmentation state is "4" as shown in FIG. 16A, a process which is carried out corresponds to the process described above under 2-1) where the segmentation state is "0". In this case, when the horizontal projection is ON, the present processing position is registered in the buffer 108b as the next line start position and the segmentation state is determined to "5" as shown in FIG. 16B. On the other hand, no process is carried out as shown in FIG. 16B when the horizontal projection is OFF.

After the determination of the segmentation state described above, the vertical projection extracting part 109 renews the content of the vertical projection buffer 110 for each of the divided regions according to the image data of the present input data line input from the image buffer 103. That is, the segmentation state of each of the divided regions is detected from the state data stored in the state buffer 107, and with respect to the divided region with the segmentation state "1" or "2", a value "1" is added to the value of each picture element position of the buffer 110a if the corresponding picture element of the present input data line is black. On the other hand, a value is added similarly to the value of each picture element position of the buffer 110b with respect to the divided region with the segmentation state "5" or "6" to renew the vertical projections, and a value is added similarly to the value of each picture element position of the buffer 110c with respect to the divided region with the segmentation state "9" or "10" to renew the vertical projections.

Therefore, the vertical projections are extracted not only for the present line but also for the next line and the line next to the next line in parallel to the line segmentation.

Next, a description will be given of the blank line process. The blank line process is carried out with respect to the next line when the segmentation state changes to "8" from a segmentation state other than "8", and is carried out with respect to the line next to the next line when the segmentation state changes to "12" from a segmentation state other than "12".

FIG. 17 is a diagram for explaining a concept of the blank line process. In FIG. 17, the document image is divided into three divided regions A, B, and C for the sake of convenience, and it is assumed that the processing takes place from the top to bottom of the document image. The following description is given with respect to only the present line. In FIG. 17, an unhatched region indicates that the horizontal projection data of each data line within the region is OFF, and a hatched region indicates that the horizontal projection data of each data line within the region is ON.

2-BLP1) When the present processing position is located at P1 shown in FIG. 17, the segmentation states of the divided regions A, B, and C are all "0".

2-BLP2) When the present processing position is located at P2 shown in FIG. 17, the segmentation states of the divided regions A and B are "2" and the segmentation state of the divided region C remains to be "0". It is assumed that the line height to the position P2 is greater than the maximum noise height $N_{max}$.

2-BLP3) When the present processing position is located at P3 shown in FIG. 17, the segmentation state of the divided region A is "2" and the segmentation state of the divided region C remains to be "0". However, the segmentation state of the divided region C changes to "4" because the segmentation of the present line is ended in the divided region B. It is assumed in this case that the line height in the divided region B is greater than or equal to the maximum line height $L_{max}$. Accordingly, the following blank line process is carried out with reference to the divided region B.

The segmentation states of the adjacent divided regions on the right and left of the divided region B are sequentially detected. It is detected that the segmentation state of the divided region A on the left of the divided region B is "2" and not "0", and the detection of the segmentation state towards the left of the divided region B is ended. Then, it is detected that the segmentation state of the divided region C on the right of the divided region B is "0". Hence, it is assumed that the present line in the divided region C is a blank line, and the present line start position and the present line end position in the divided region B are respectively registered as the present line start position and the present line end position in the divided region C. In this state, the sign of the blank line is added. Furthermore, the segmentation state of the divided region C is changed to "4".

As a result, the segmentation states of the divided regions A, B, and C respectively become "2", "4" and "4".

2-BLP4) When the present processing position is located at P4 shown in FIG. 17, the segmentation of the present line in the divided region A is ended, and the segmentation state of the divided region A is changed from "2" to "4". Accordingly, a blank line process is carried out with reference to the divided region A. First, the segmentation state is detected with respect to the divided region towards the left of the divided region A, but the detection is ended because no divided region exists on the left of the divided region A. Next, the segmentation state is detected with respect to the divided region towards the right of the divided region A, but the detection is ended because the segmentation state of the divided region B on the right of the divided region A is "4".

As a result, the segmentation states of the divided regions A, B, and C respectively become "4", "4" and "4".

A step 1006 carries out by the controller 101 a process dependent on the results of the discrimination of the conditions described below. That is, the step 1006 refers to the content of the state buffer 107 and discriminates the conditions by the following processes 2-a) through 2-c) in this sequence and carries out a process dependent on the discrimination result. The process is ended at the stage when the conditions stand.

2-a) When the segmentation state of all of the divided regions is "0", the data of the present input data line is destroyed. In other words, the data of the input data line is destroyed by not incrementing the pointer of the image buffer 103 and returning to the step 1003 to write the image data of the next data line at the same position over the data of the input data line.

2-b) When there exists at least one divided region with a segmentation state which is less than "4", it is discriminated that the segmentation is not ended and the data of the present input data line is maintained. In other words, the data of the present input data line is maintained by incrementing the pointer of the image buffer 103 by one data line before returning to the step 1003.

2-c) When the segmentation state of all of the divided regions is greater than or equal to "4", it is discriminated that the segmentation is ended and the data of the present input data line is maintained. In other words, the data of the present input data line is maintained by incrementing the pointer of the image buffer 103 by one data line, and the process advances to a step 1008.

When the present processing position is P4 in FIG. 17, the segmentation states of all of the divided regions A, B, and C become "4". In other words, the conditions for ending the line segmentation are satisfied, and it is discriminated that the line segmentation is ended.

A step 1007 discriminates by the controller 101 whether or not the line segmentation is ended. Hence, when the step 1006 discriminates that the segmentation is not ended and the discrimination result in the step 1007 is NO, the process returns to the step 1003 which inputs the data of the next data line. On the other hand, when the step 1006 discriminates that the segmentation is ended and the discrimination result in the step 1007 is YES, the process advances to a next step 1008.

The step 1008 makes a character segmentation by the character segmentation part 111. When the character segmentation part 111 is activated by the controller 101, the character segmentation part 111 refers to the contents of the buffers 110a and 108a and determines the range of the character segmentation as described before in conjunction with the step 208 shown in FIG. 3, and segments the image of each character in the present line from the input image data stored in the image buffer 103.

A step 1009 makes a feature extraction and character recognition of the segmented character image by the feature extraction and recognition part 112, similarly as in the case of the conventional character recognition apparatus. When the process is completed for all of the characters in the present line, the process returns to the step 1002 and the controller 101 renews the segmentation state.

Next, a more detailed description will be given of the process carried out by the step 1002. When the process returns to the step 1002 from the step 1009, the controller 101 carries out the following process.

First, the segmentation state of each divided region registered in the state buffer 107 is renewed to a value which is obtained by subtracting "4". Hence, when the registered segmentation state of the divided region is "4", the renewed segmentation state is "0" (=4-4).

Next, a reference is made to the buffers 108a, 108b, and 108c and the image data within the image buffer 103 is shifted upwardly so that the uppermost present line start position is at the top within the image buffer 103. In addition, the pointer of the image buffer 103 is decremented by an amount dy of the shift of the image data within the image buffer 103. Furthermore, the following process is also carried out.

2-i) When the maximum segmentation state before the renewal is "4", the buffers 108a and 110a are cleared.

2-ii) When the maximum segmentation state before the renewal is greater than "4" but less than or equal to "8", positions obtained by subtracting the amount dy from the next line start position and the next line end position are respectively registered in the buffer 108a as the present line start position and the present line end position. In addition, the content of the buffer 110b is copied into the buffer 110a, and the buffer 110b is cleared.

2-iii) When the maximum segmentation state before the renewal is greater than "8" but less than or equal to "12", positions obtained by subtracting the amount dy from the next line start position and the next line end position are respectively registered in the buffer 108a as the present line start position and the present line end position, and positions obtained by subtracting the amount dy from the line start position and the line end position of the line next to the next line are respectively registered in the buffer 108b as the next line start position and the next line end position. In addition, the content of the buffer 110b is copied into the buffer 110a, and the content of the buffer 110c is copied into the buffer 110b. Finally, the buffers 108c and 110c are cleared.

The content of a buffer need not necessarily be copied into another buffer, and it is of course possible to simply switch the usage of the buffers.

In the example of the line segmentation shown in FIG. 7, the horizontal projection turns ON in the sequence of the divided regions 4, 3, 2, and 1 for the present line. In the stage where the divided region 1 detects the present line and the segmentation state becomes "4", the segmentation of the present line is ended. At this stage, the divided regions 2 and 3 have the segmentation state "5" or "6" and the divided region 4 has the segmentation state "8". In addition, extraction of the vertical projections of the next line is finished with respect to the divided region 4.

By the above described process, it is possible to easily and positively segment the character even when the character is at the boundary of two divided regions. In addition, the separation of the line will not occur even when characters such as "a", "s", "e", "r" and "o" having the small height and characters such as "i" and "j" coexist on the same line.

Moreover, the line segmentation can be made positively even when the skew is large or the quantity of noise is large, by introducing the maximum noise height, the minimum line height and the maximum line height in the process of determining the segmentation state. In addition, it is possible to positively extract as one line even the line which is separated because this embodiment has the function of merging the line. By adjusting each of the above parameters, it is possible to appropriately control the skip reading of the noise, the merging of the separated line and the like depending on the subject of the process. It is also possible to omit the re-processing of the read image data and the backtracking.

Next, a description will be given of a third embodiment of the method of segmenting characters of a document image according to the present invention. In this embodiment, the process as a whole is generally the same as that shown in FIG. 10, and the process can be carried out on the character recognition apparatus shown in FIG. 9. This embodiment differs from the second embodiment in that the step 1005 shown in FIG. 10 takes into consideration the segmentation state of an adjacent divided region when determining or controlling the segmentation state of each of the divided regions.

Particularly, out of the state transitions from the segmentation states "0" through "4", the transition control from the segmentation states "1" and "3" differ from that of the second embodiment as may be seen from FIGS. 18A, 18B, and 19A through 19E. The transition control from the segmentation states "0", "2" and "4" is the same as that of the second embodiment as described in conjunction with FIGS. 12A, 12B, 13A, 13B, 16A and 16B.

3-1) When the present segmentation state is "1" as shown in FIG. 18A and the horizontal projection is ON, the segmentation state is determined to "2" as shown in FIG. 18B if the distance hc between the present line start position and the present processing position exceeds the maximum noise height $N_{max}$. On the other hand, when the horizontal projection is OFF, the position one data line before the present processing data line is registered as the present line end position and the segmentation state is determined to "3" as shown in FIG. 18B if the segmentation state of one of the adjacent divided region on the right or left of the concerned divided region is "1" or "2", that is, the present line. If the segmentation state of one of the adjacent divided region on the right or left of the concerned divided region is other than "1" and "2", that is, not the present line, the present line is eliminated as noise similarly as in the case of the second embodiment and described in conjunction with FIGS. 13A and 13B.

3-2) When the present segmentation state is "3" as shown in FIG. 19A and the horizontal projection is ON, the segmentation state is determined to "2" as shown in FIG. 19B if the segmentation states of the two adjacent divided regions on the right and left of the concerned divided region are other than "5" and "6" as shown in FIG. 19C, that is, not the next line. If the segmentation state of one of the adjacent divided regions on the right and left of the concerned divided region is "5" or "6" as shown in FIG. 19D, that is, the next line, the present processing position is registered as the next line start position, the blank line process is carried out with respect to the present line and the segmentation state is determined to "5" as shown in FIG. 19B. On the other hand, when the horizontal projection is OFF, the blank line process is carried out with respect to the present line and the segmentation state is determined to "4" as shown in FIG. 19B if the distance hc between the present line start position and the present processing position exceeds the minimum line height $L_{min}$ as shown in FIG. 19E. If the distance hc between the present line start position and the present processing position is less than or equal to the minimum line height, the segmentation state is maintained to "3" as shown in FIG. 19B and no special process is carried out.

According to this embodiment, the segmentation states of the adjacent divided regions on the right and left of the concerned divided region are used (with an appropriate timing for a sufficient number of times) in addition to the information on the concerned divided region when eliminating the noise in each of the divided regions or merging the separated line. Therefore, the reliability of the segmentation is even more improved compared to the second embodiment.

Figure 20A:
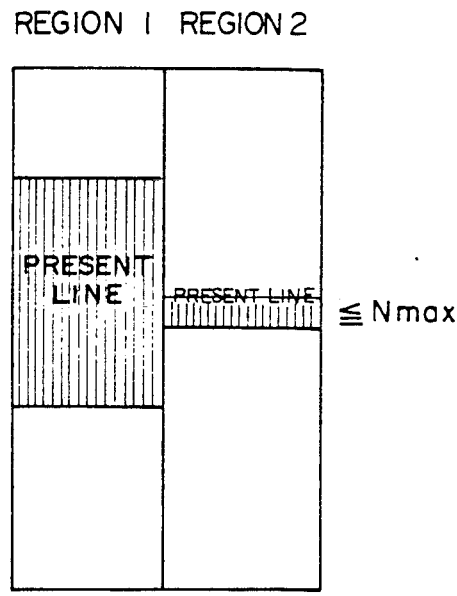
FIGS. 20A and 20B respectively are diagrams for explaining elimination of noise and merging of separated line.
Figure 20B:
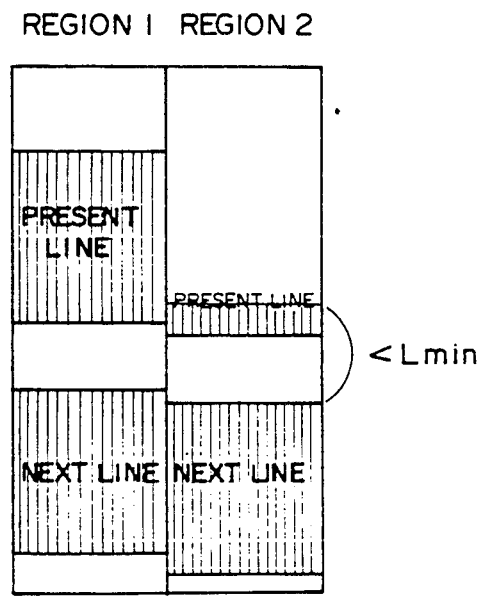

Next, a description will be given of the advantages of the third embodiment by referring to FIGS. 20A and 20B. As shown in FIG. 20A, the present line in the divided region 2 is the original line, but the line is eliminated as noise according to the second embodiment if the line height is less than or equal to the maximum noise height $N_{max}$. However, according to the third embodiment, the present line in the divided region 2 is also positively segmented as a line because a reference is made to the segmentation state of the divided region 1. Further, in the case of the present line in the divided region 2 shown in FIG. 20B, the distance between the present line start position and the next line start position is less than the minimum line height $L_{min}$ and the present line and the next line in the divided region 2 are erroneously merged according to the second embodiment. But according to the third embodiment, such an erroneous merging of the present line and the next line in the divided region 2 is prevented since a reference is made to the existence of the present line and the next line in the divided region 1.

Next, a description will be given of a fourth embodiment of the method of segmenting characters of a document image according to the present invention. In this embodiment, the process as a whole is generally the same as that shown in FIG. 10, and the process can be carried out on the character recognition apparatus shown in FIG. 9. This embodiment differs from the third embodiment in that an error in the connection of the line is detected and corrected in order to further improve the reliability of the line segmentation even when the interval of the lines is narrow. Only the process which differs from that of the third embodiment will be described hereunder.

Figure 21A:
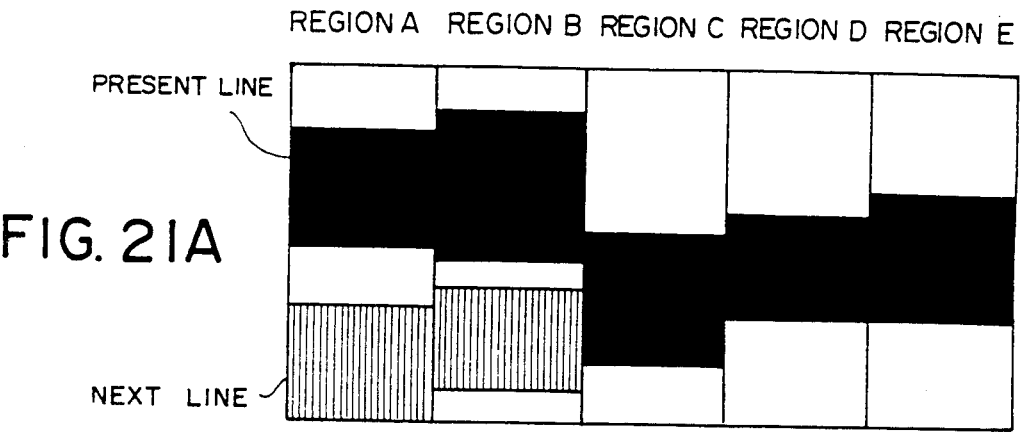
FIGS. 21A and 21B respectively ar diagrams for explaining an erroneous connection of a line.
Figure 21B:
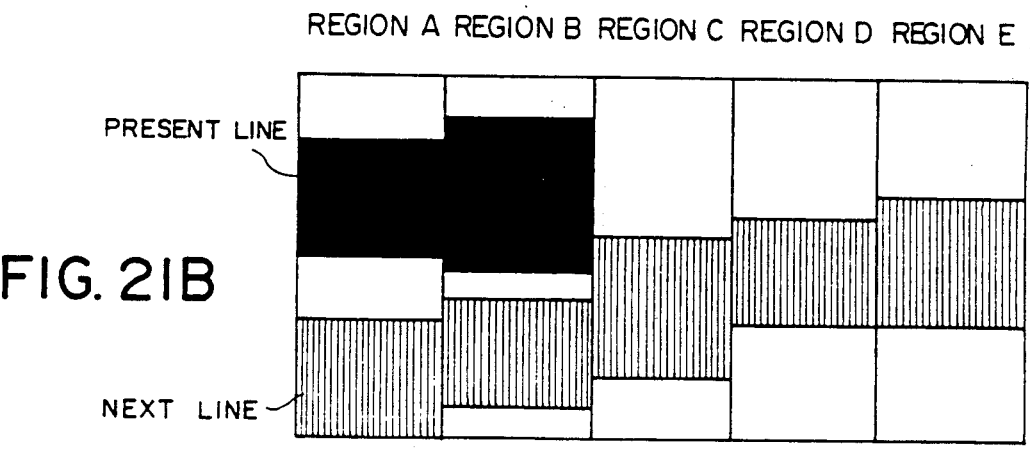

The error in the connection of the line often occurs depending on the document format when the document is inclined as shown in FIG. 21A. The lines should originally be segmented from the document image as shown in FIG. 21B, but the next line is erroneously extracted as the present line as shown in FIG. 21A, because the present line is a blank line in divided regions C, D, and E. A blank line process with reference to the divided region B is carried out at a time when the present line end position in the divided region B is detected, but the blank line cannot be detected because the next line is already being extracted as the present line in the divided region C.

According to this fourth embodiment, the step 1005 carries out the following process.

Figure 22A:
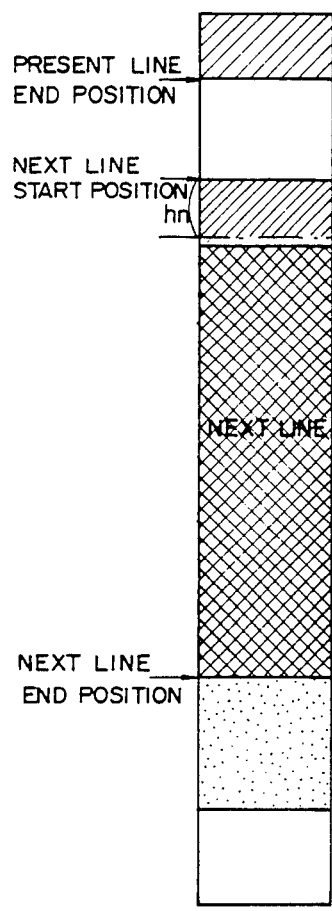
FIGS. 22A and 22B respectively are diagrams for explaining a segmentation state "5" and a determination process thereof in a fourth embodiment of the method of segmenting characters of a document image according to the present invention.
Figure 22B:
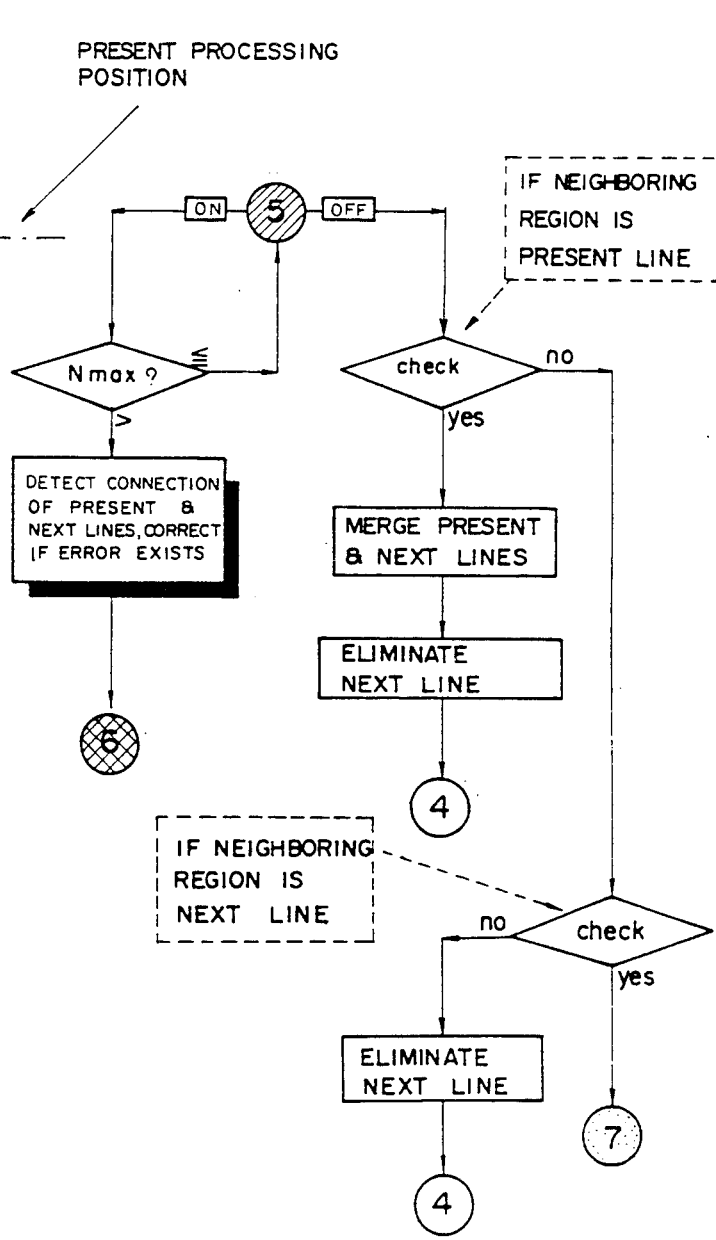

4-1) When the present segmentation state is "5" as shown in FIG. 22A and the horizontal projection is ON, the connection of the present line and the next line is detected if the distance between the next line start position and the present processing position exceeds the maximum noise height $N_{max}$. When an error exists, the error is corrected and the segmentation state is determined to "6" as shown in FIG. 22B. The actual process of detecting the connection and correcting the error will be given later in the specification. On the other hand, when the horizontal projection is OFF, a discrimination is made to determine which of the adjacent divided regions on the right and left of the concerned divided region has the segmentation state "1" or "2", that is, the present line. When the present line is discriminated and the condition is satisfied, the next line and the present line are merged, the next line is eliminated and the segmentation state is determined to "4" as shown in FIG. 22B. Particularly, the position one data line before the present processing position is registered as the present line end position, the vertical projection value of the next line is added to the vertical projection value of the present line, and the vertical projection value of the next line is reset to "0". Of course, the vertical projection value is processed only in a range corresponding to the concerned divided region.

When the first discriminating condition is not satisfied, the second discrimination is carried out. In other words, a discrimination is made to determine which of the adjacent divided regions on the right and left of the concerned divided region has the segmentation state "5" or "6", that is, the next line. When this condition is satisfied, the line is considered to be the next line although the line height is less than or equal to the maximum noise height $N_{max}$, and the segmentation state is determined to "7" as shown in FIG. 22B. On the other hand, when this condition is not satisfied, the next line is eliminated as noise and the segmentation state is determined to "4" as shown in FIG. 22B. The elimination of the next line in this case means the resetting of the vertical projection value to "0".

4-2) When the present segmentation state is "9", a process similar to that described above under 4-1) is carried out except that the present line is replaced by the next line, the next line is replaced by the line next to the next line, and the segmentation states "1" through "7" are respectively replaced by the segmentation states "5" through "11". However, this process is omitted if the processing is restricted to the next line.

Next, a description will be given of the detection and correction of the error in the connection of the line. The detection and correction of the error are carried out when the segmentation state changes from "5" to "6". The detection and correction of the error are also carried out when the segmentation state changes from "9" to "10" if extended to three lines including the line next to the next line.

Figure 23A:
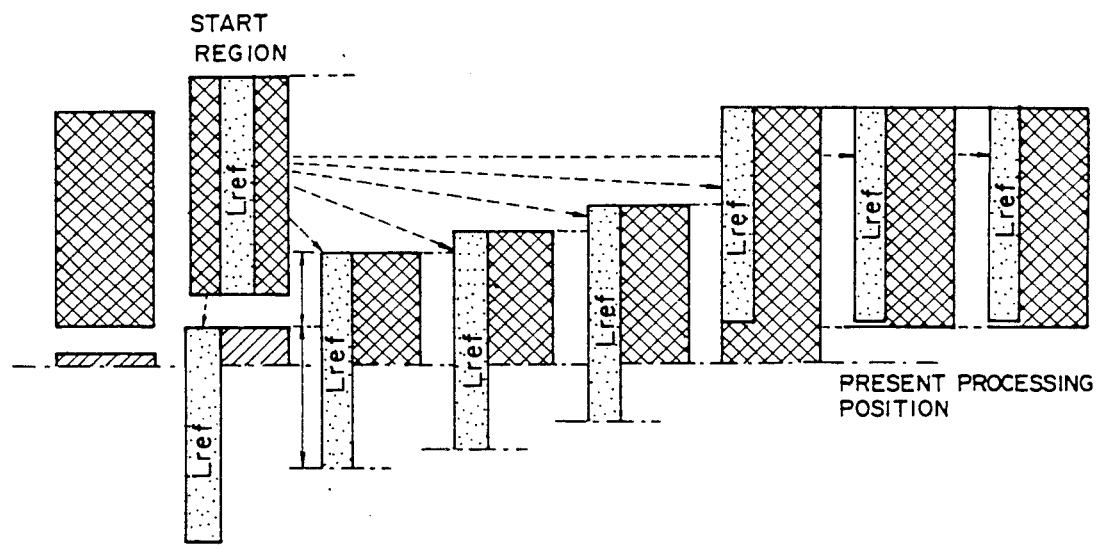
FIGS. 23A through 23C respectively are diagrams for detecting an error in a connection of a line.
Figure 23B:
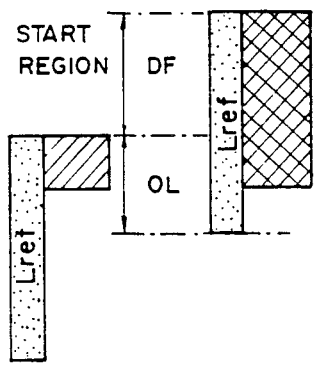
Figure 23C:
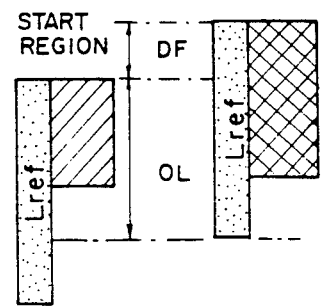

FIGS. 23A through 23C respectively are diagrams for explaining a method of detecting an error in the connection of the present line and the next line. In FIGS. 23A through 23C, a portion which is segmented as the present line is indicated by a dotted area and a portion which is segmented as the next line is indicated by a hatched area. Further, a "start region" denotes the divided region in which the error detection is started. In FIG. 23A, the divided region 2 which is the second region from the left at the present processing position changes from the segmentation state "5" to "6". Hence, the connection of the line is checked in the directions to the right and left with reference to the divided region 2.

First, when checking towards the left, a check is made in a first stage to determine whether or not the segmentation state of the adjacent divided region is "2". In FIG. 23A, the segmentation state of the divided region 1 on the left is "5", and the checking towards the left is ended in this case.

Next, when checking towards the right, a check is made in a first stage to determine whether or not the segmentation state of the adjacent divided region is "2". In FIG. 23A, the segmentation state of the divided region 3 on the right is "2", and the checking towards the right progresses to a second stage. In the second stage, a discrimination is made to determine whether or not the line in the divided region 2 and the line in the divided region 3 may be considered to be the same line, that is, the continuity of the lines in the divided regions 2 and 3 is checked, based on a state of overlap between the lines in the divided regions 2 and 3. It is necessary to infer the line height in order to detect the state of overlap of the lines since there is a divided region such as the divided region 3 in which the line height at the present processing position is not yet confirmed. Thus, in this embodiment, the state of overlap of the lines is detected by using the line height of the present line in the reference divided region 2 as a reference line height $L_{ref}$ as shown in FIG. 23A.

And when an overlap OL of the next line in the divided region 2 and the present line in the divided region 3 is smaller than a projecting portion DF as shown in FIG. 23B, it is discriminated that these lines are not the same line. This means that the line which is being segmented as the present line in the divided region 3 is the present line and not an error in the connection.

On the other hand, when the overlap OL of the next line in the divided region 2 and the line in the divided region 3 is greater than the projecting portion DF as shown in FIG. 23C, it is discriminated that these lines are the same line. This means that the line in the divided region 3 is not the present line and an error in the connection.

The connection (or continuity) is checked similarly with respect to the other divided regions successively towards the right, namely, the divided regions "3" and "4", the divided regions "4" and "5" and the like.

The method of determining the reference line height $L_{ref}$ is not limited to the above. For example, it is possible to set as the reference line height $L_{ref}$ a maximum value of the heights of the present line segmented from all of the divided regions. Furthermore, it is possible to set as the reference line height $L_{ref}$ the height of the line segmented one line before, and it is also possible to preset the reference line height $L_{ref}$ to a predetermined value.

When the divided region is discriminated as having the error in the connection of the line, the error in the connection is corrected by setting the value of the present line to the next line. Particularly, the vertical projection value of the line which is erroneously segmented as the present line is copied as the vertical projection value for the next line and the vertical projection value of the present line is reset to "0". The present line start position and the present line end position are respectively copied as the next line start position and the next line end position, and appropriate dummy values (for example, values which are both immediately above the new next line) are set for the present line start position and the present line end position. In addition, a value "4" is added to the segmentation state of the divided region in which the correction is made.

As may be understood from the above description, the fourth embodiment detects and corrects the error in the line segmentation by checking the continuity of the line. For this reason, it is possible to improve the reliability of the line segmentation even when the document image has a large skew and the interval of the lines is narrow, and the accuracy of the character segmentation is considerably improved.

Next, a description will be given of a fifth embodiment of the method of segmenting characters of a document image according to the present invention. In this embodiment, the process as a whole is generally the same as that shown in FIG. 10, and the process can be carried out on the character recognition apparatus shown in FIG. 9. This embodiment differs from the third embodiment in that this fifth embodiment carries out an additional process of detecting a generation of a line connection and forcibly separating a connected line which is detected. Only the process which differs from that of the third embodiment is described hereunder.

The line connection refers to a state where the blank space between the lines cannot be detected from the horizontal projections and the two successive lines cannot be separated, and it does not mean that the two successive lines are literally connected in the document image. The line connection occurs when the interval of the lines is extremely small and the skew is large. In addition, a line in which the line connection is generated will hereinafter be referred to as a connected line. The forced separation of the connected line refers to a process of determining or inferring the interval between the lines which basically cannot be detected from the horizontal projections.

Figure 24B:
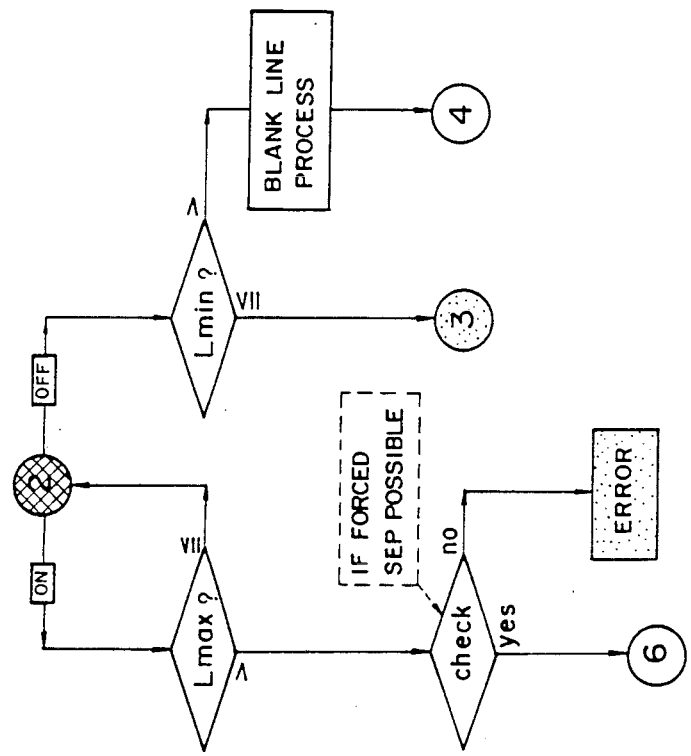
FIGS. 24A and 24B respectively are diagrams for explaining a detection of a line connection of the present line and a segmentation state related thereto in a fifth embodiment of the method of segmenting characters of a document image according to the present invention.
Figure 24A:
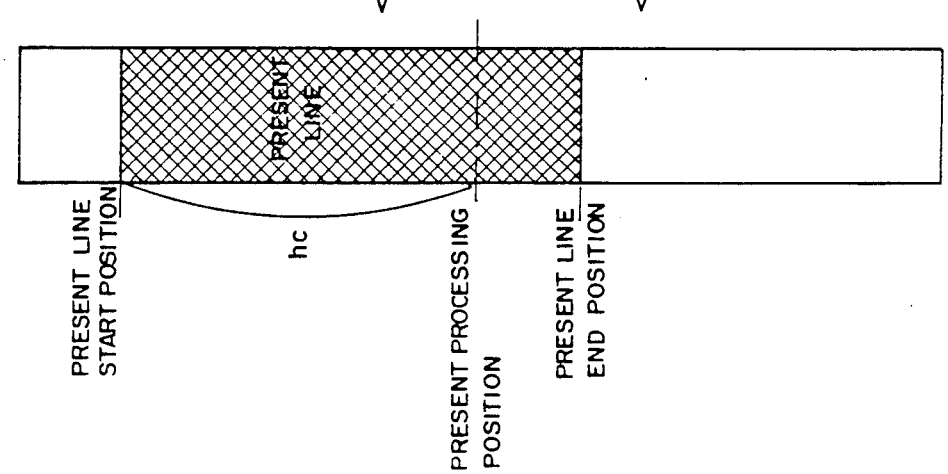

In this embodiment, the step 1005 shown in FIG. 10 carries out the detection of the line connection and the forced separation of the connected line. FIGS. 24A and 24B respectively are diagrams for explaining the detection of the line connection of the present line and the segmentation state related thereto in the fifth embodiment. As shown in FIG. 24B, a check is made to determine whether or not a forced separation of the connected line can be made by discriminating the line connection when the height of the present line (segmentation state "2") exceeds the maximum line height $L_{max}$. When the forced separation of the connected line is possible, a forced separation process is carried out and the segmentation state is determined to "6". On the other hand, a segmentation process error is detected when the forced separation of the connected line is not possible. The above process is carried out similarly with respect to the next line and the line next to the next line. A process similar to that of the fourth embodiment is carried out when the horizontal projection is OFF.

Figure 25:
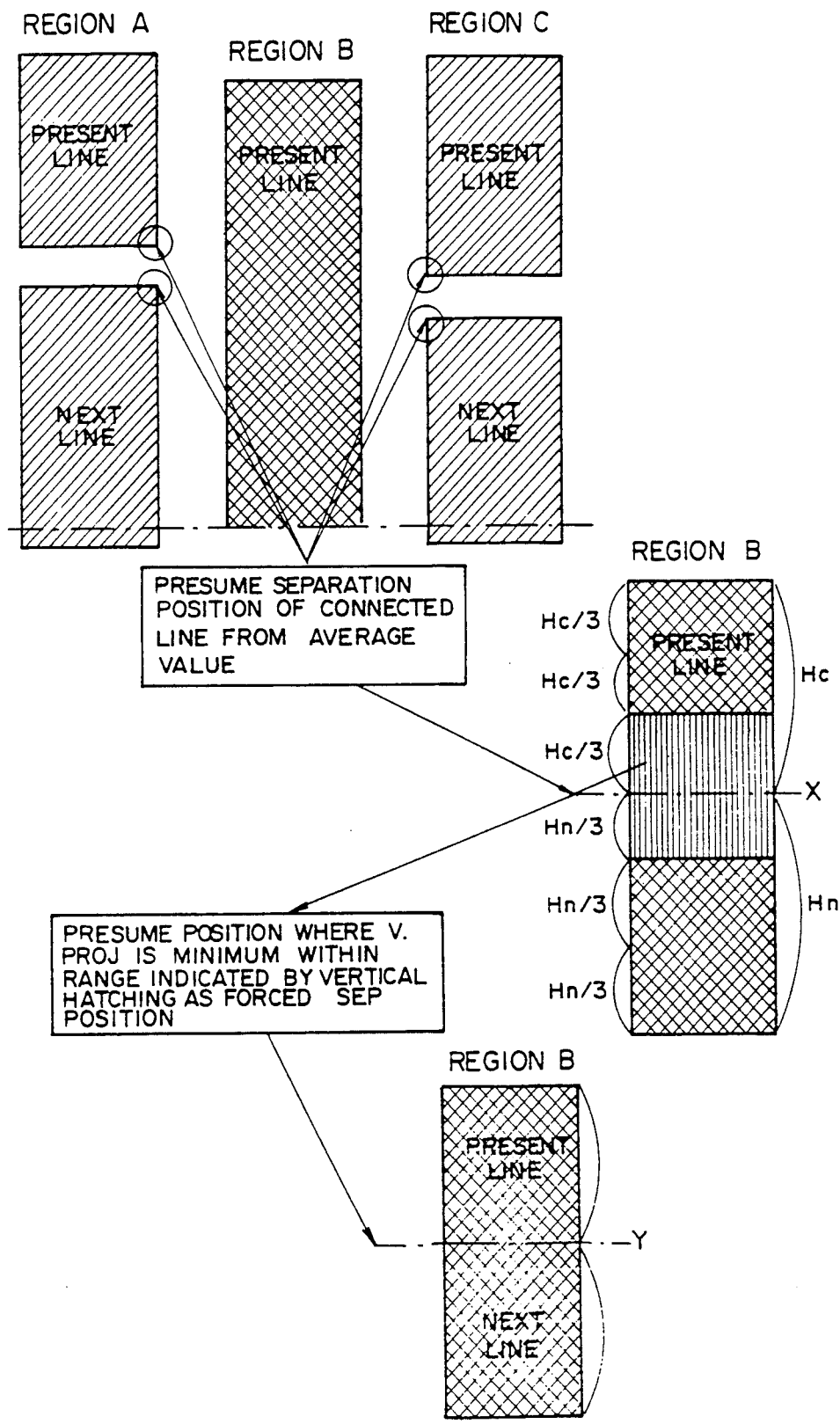
FIG. 25 is a diagram for explaining a forced separation process with respect to a connected line in the fifth embodiment.

The forced separation process with respect to the connected line will now be described in conjunction with FIG. 25. FIG. 25 is a diagram for explaining the forced separation process with respect to the present line in the divided region B.

5-1) First, an average position X of the present line end position and the next line start position in the divided region A on the left of the divided region B and in the divided region C on the right of the divided region B is taken as a presumed separation position.

In a case where there exists an undetermined position within each of the line start positions and the line end positions in the divided regions which are adjacent to the concerned divided region in which the connected line is detected, the presumed separation position X is obtained as follows. That is, when the present line end position of a certain divided region adjacent to the concerned divided region is known but the next line start position of this certain divided region is not known, the presumed separation position X is presumed by using the present processing position as the next line start position. In addition, when the present line end position of the certain divided region is not known, the presumed separation position X is presumed by not using this certain divided region.

It is discriminated that the forced separation is impossible when the present line end position in both the adjacent divided regions on the right and left of the concerned divided region is not known.

5-2) Next, the presumed separation position X is taken as a center, and a range of $\frac{7}{8}$ a height $H_c$ of the upper portion of the divided region B and a range of $\frac{7}{8}$ a height $H_n$ of the lower portion of the divided region B are set. A position where the horizontal projection is a minimum within these ranges is taken as a forced separation position Y. Accordingly, in this embodiment, the horizontal projection is not only the data "0" and "1" and it is also necessary to extract data on the number of black picture elements.

5-3) The upper portion of the line in the divided region B is taken as the present line and the lower portion of the line in the divided region B is taken as the next line, and the line is forcibly separated about the forced separation position Y. In other words, the present line end position is set as the next line end position, the forced separation position Y is set as the present line end position, and a position of a line which is one line below the forced separation position X is set as the next line start position. Furthermore, the vertical projection value of the separated next line is subtracted from the vertical projection value of the present line and corrected, so as to determine the segmentation state of the divided region B to a segmentation state which is added with a value "4".

Next, a description will be given of a sixth embodiment of the method of segmenting characters of a document image according to the present invention. In this embodiment, the process as a whole is generally the same as that shown in FIG. 10, and the process can be carried out on the character recognition apparatus shown in FIG. 9. This embodiment differs from the fifth embodiment in that this sixth embodiment detects the line connection when the blank line process is started in the step 1005 shown in FIG. 10 and the line connection is discriminated by detecting a contradiction in an overlap with a line in an adjacent divided region. Only the process which differs from that of the fifth embodiment is described hereunder.

Figure 26A:
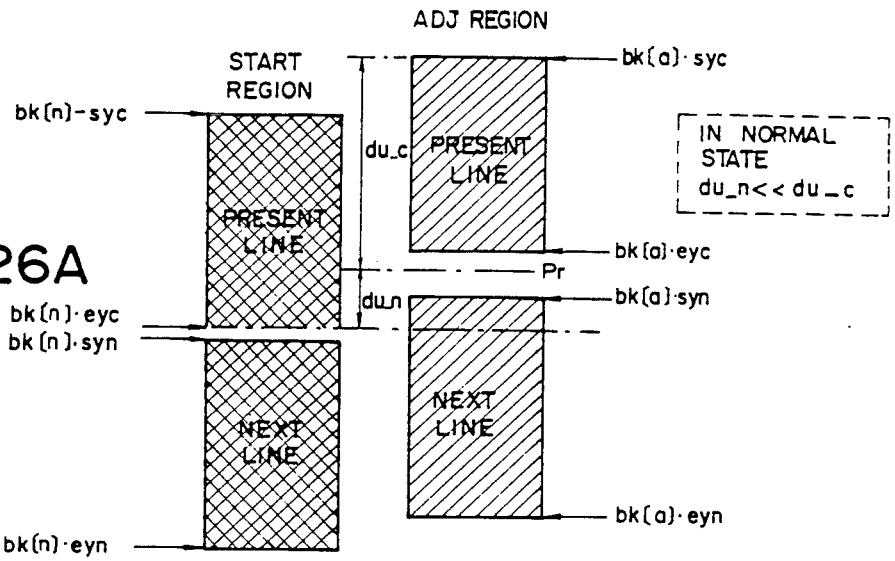
FIGS. 26A and 26B respectively are diagrams for explaining a detection of a line connection in a sixth embodiment of the method of segmenting characters of a document image according to the present invention.
Figure 26B:
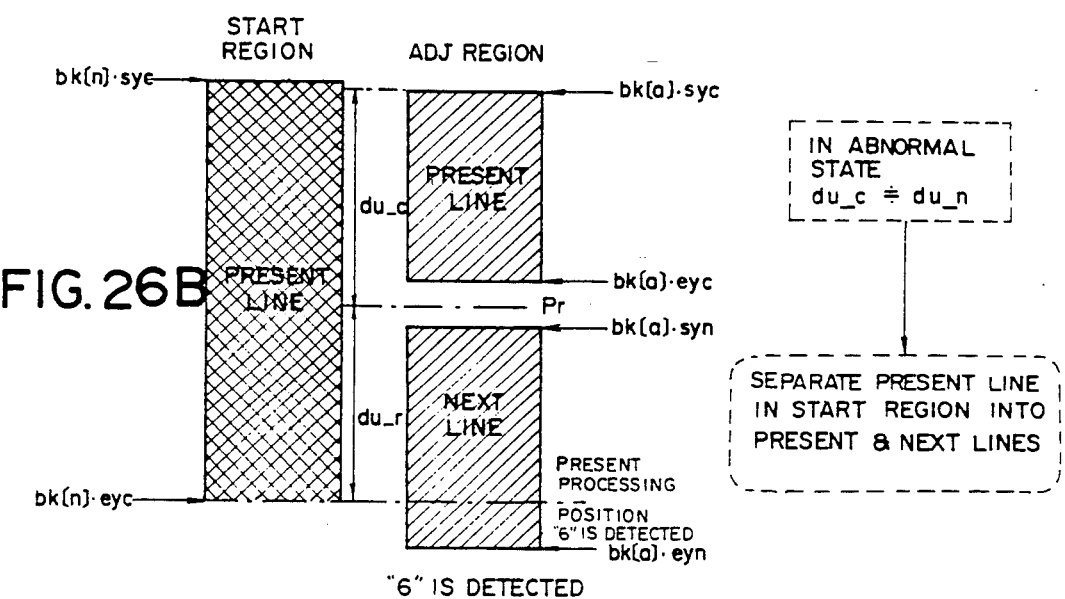

A description will be given of the detection of the line connection for a case where the segmenting of the present line is ended and the blank line process is started, by referring to FIGS. 26A and 26B. A contradiction check on the overlap is first carried out with respect to the adjacent divided region on the left of the concerned divided region in which the blank line process is started and is then carried out with respect to the adjacent divided region on the right of the concerned divided region. In FIGS. 26A and 26B, only the adjacent divided region on the right of the concerned divided region is shown, but the adjacent divided region on the left of the concerned divided region may be considered to be basically the same as the adjacent divided region on the right of the concerned divided region.

In FIGS. 26A and 26B, n denotes a divided region in which the blank line process is started, and a denotes an adjacent divided region which is on the right or left of the divided region n. In addition, bk[z].syc denotes a present line start position in a region [z], bk[z].eyc denotes a present line end position in a region [z], bk[z].syn denotes a next line start position in a region [z], bk[z].eyn denotes a next line end position in a region [z], bk[z].syt denotes a line start position of the line next to the next line in a region [z], and bk[z].eyt denotes a line end position of the line next to the next line in a region [z], where z is n or a.

The line connection is detected in the following sequence.

6-1) A discrimination is made to determine whether or not the segmentation state of the adjacent divided region a is "6" and the detection is ended when the segmentation state is not "6".

6-2) When the segmentation state of the adjacent divided region a is "6", a center position between the present line end position and the next line start position in the adjacent divided region a is set to a reference position Pr.

6-3) A detection is made to determine how the divided region n is divided with respect to the reference position Pr. In other words, when the height of a portion below the reference position Pr is extremely small compared to the height of a portion above the reference position Pr, a "normal" state in which no line connection is generated is discriminated as shown in FIG. 26A. On the other hand, when the heights of the portions above and below the reference position Pr are approximately the same, an "abnormal" state in which a line connection is generated is discriminated as shown in FIG. 26B. In FIGS. 26A and 26B, the height of the portion above the reference position Pr is denoted by du_c, and the height of the portion below the reference position Pr is denoted by du_n. The reference position Pr and the heights du_c and du_n may be calculated from the following formulas.

Pr = (bk[a].eyc + bk[a].eym)/2 du_c = Pr − bk[n].syn du_n = bk[n].eyc − Pr

The line connection is detected with respect to the present line in the manner described above, and the line connection may be detected similarly with respect to the next line. But in this case, the processing system must support the line next to the next line (that is, have a data structure and a program which can describe and process the line next to the next line) in order to detect the line connection of the next line and make the forced separation of the connected line.

Figure 27A:
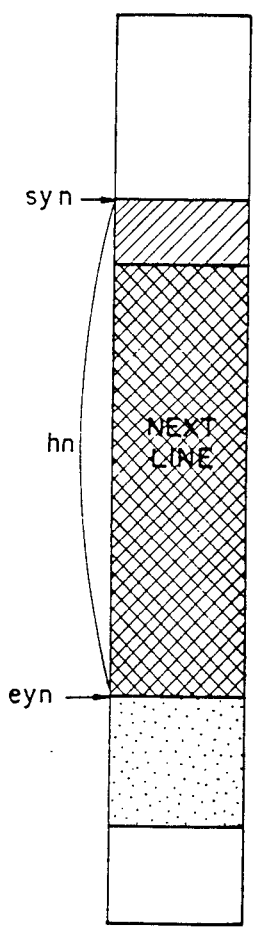
FIGS. 27A and 27B respectively are diagrams for explaining a segmentation state and a determination process thereof in the sixth embodiment ween a blank line process is started.
Figure 27B:
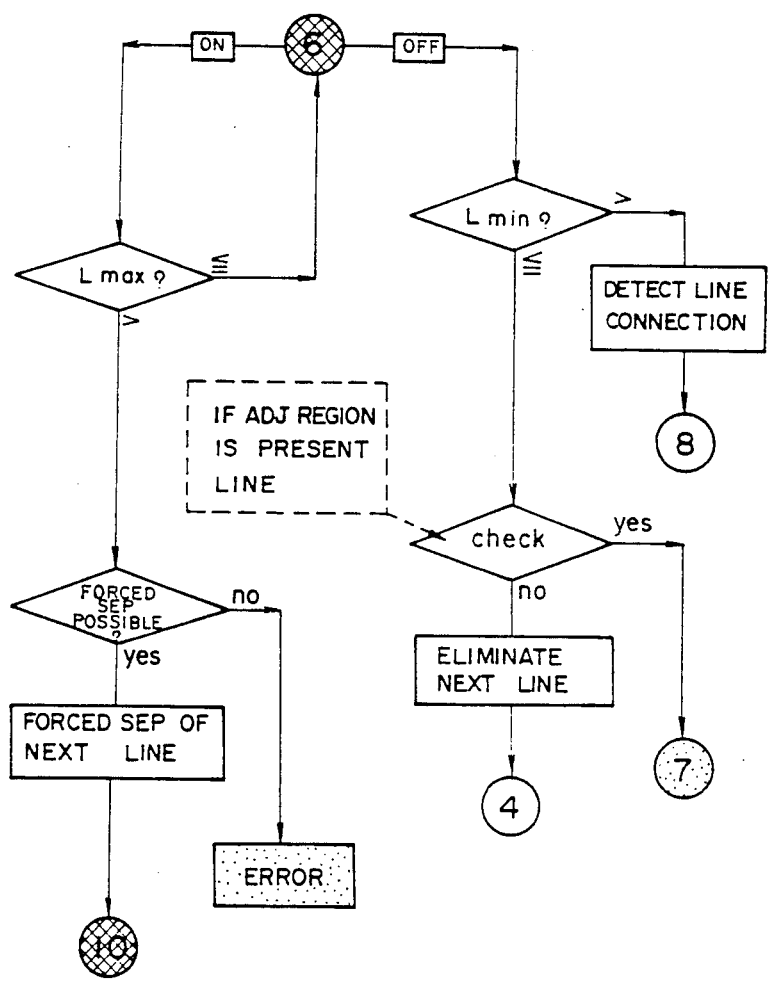
Figure 28A:
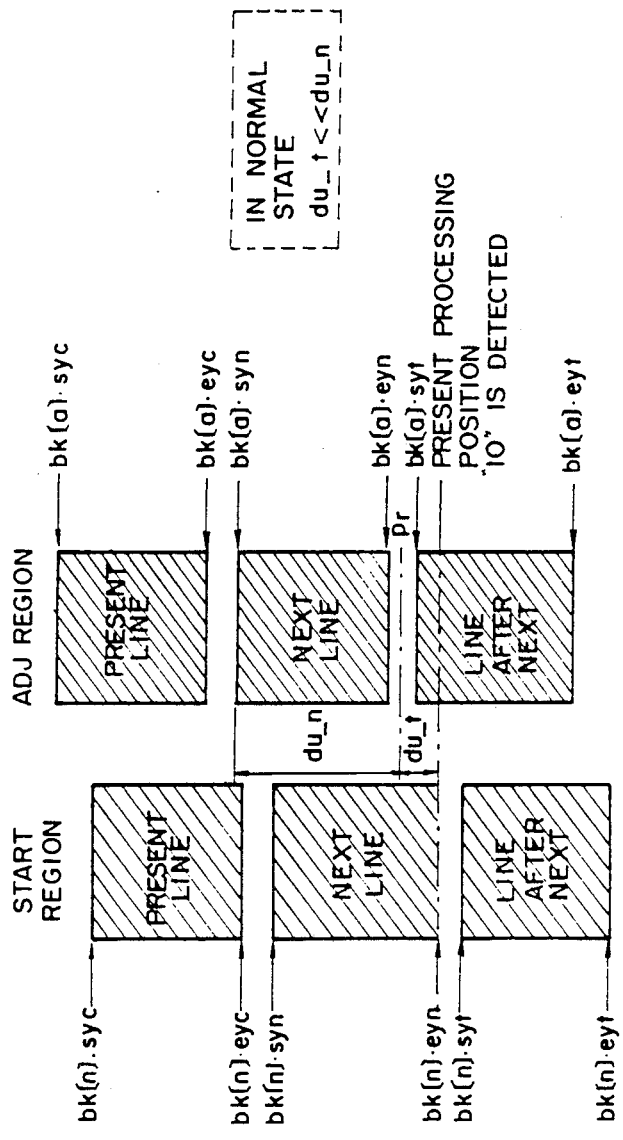
FIGS. 28A and 28B respectively are diagrams for explaining a detection of a line connection in the sixth embodiment when the blank line process is started.
Figure 28B:
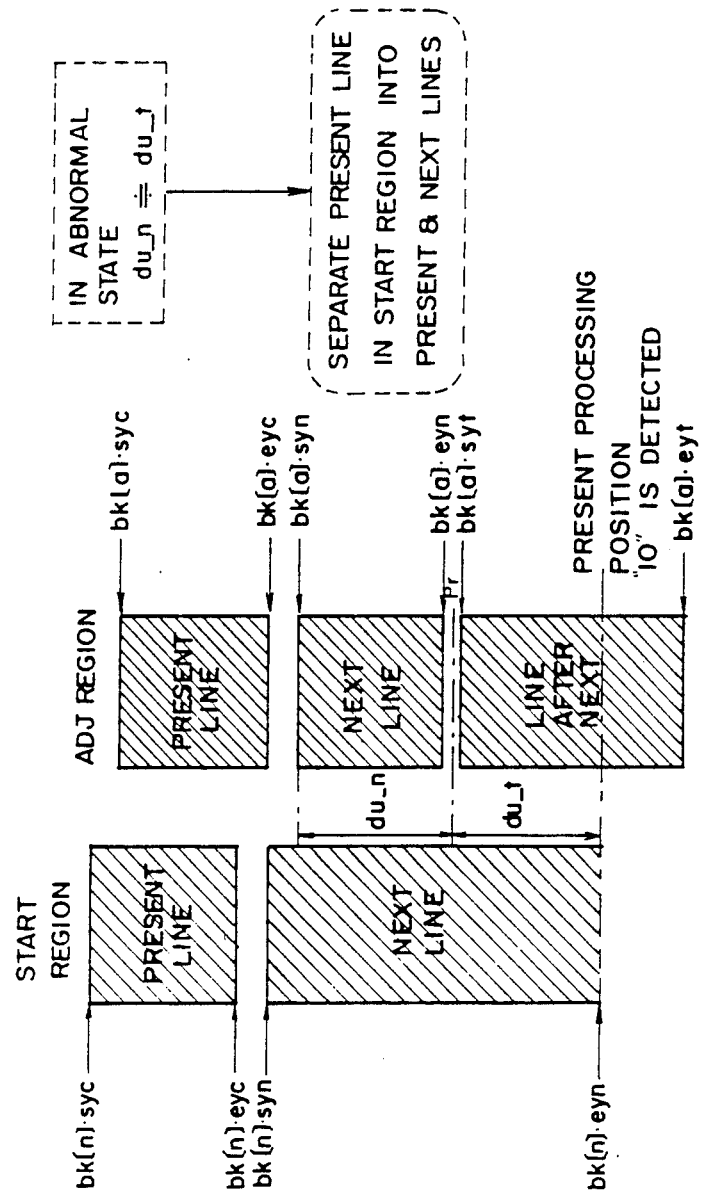

FIGS. 27A and 27B show a case where the blank line process is started with respect to the next line. In addition, FIGS. 28A and 28B respectively are diagrams for explaining a detection of a line connection in the sixth embodiment when the blank line process is started with respect to the next line. The detection of the line connection in this case may easily be understood by replacing the present line to the next line and the next line to the present line in the description given with reference to FIGS. 26A and 26B. For this reason, a description of FIGS. 27A, 27B, 28A, and 28B will be omitted. In FIGS. 28A and 28B, the reference position Pr and the heights du_n and du_t may be calculated from the following formulas.

Pr = (bk[a].eyn + bk[a].syt)/2 du_n = Pr − bk[a].syn du_t = bk[n].eyn − Pr

Next, a description will be given of a seventh embodiment of the method of segmenting characters of a document image according to the present invention. In this embodiment, the process as a whole is generally the same as that shown in FIG. 10, and the process can be carried out on the character recognition apparatus shown in FIG. 9. In other words, when the segmentation state of the adjacent divided region is inappropriate, the line connection is detected by detecting the overlap and the forced separation process is carried out similarly to the sixth embodiment. This embodiment differs from the sixth embodiment in that this seventh embodiment carries out the detection of the line connection under different conditions. Only the process which differs from that of the sixth embodiment is described hereunder.

Figure 29A:
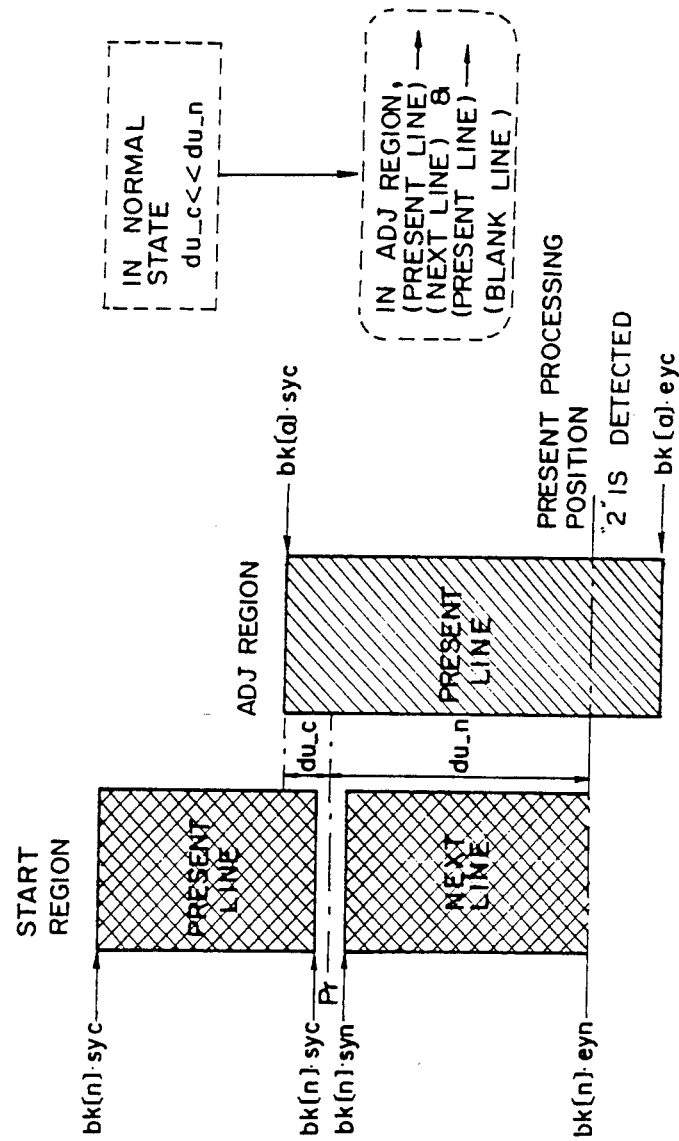

The detection of the line connection will be described for a case where the segmentation of the next line is ended and the blank line process is started, by referring to FIGS. 29A and 29B. The line connection of the present line in the adjacent divided region is detected in this case.

First, the line connection is detected in the adjacent divided region on the left of the concerned divided region in which the blank line process is started, and the line connection is then detected in the adjacent divided region on the right of the concerned divided region. In FIGS. 29A and 29B, only the adjacent divided region on the right of the concerned divided region is shown, but the adjacent divided region on the left of the concerned divided region may be considered to be basically the same as the adjacent divided region on the right of the concerned divided region.

The line connection is detected in the following sequence.

7-1) A discrimination is made to determine whether or not the segmentation state of the adjacent divided region a is "2" and the detection is ended when the segmentation state is not "2".

7-2) When the segmentation state of the adjacent divided region a is "2", a center position between the present line end position and the next line start position in the adjacent divided region a is set to a reference position Pr.

7-3) A detection is made to determine how the divided region n is divided with respect to the reference position Pr. In other words, when the height of a portion above the reference position Pr is extremely small compared to the height of a portion below the reference position Pr, a "normal" state in which no line connection is generated is discriminated as shown in FIG. 29A. In this case, however, the present line in the adjacent divided region should be considered as the next line, and the process of the fourth embodiment is carried out to correct the error in the line connection. On the other hand, when the heights of the portions above and below the reference position Pr are approximately the same, an "abnormal" state in which a line connection is generated is discriminated as shown in FIG. 29B. In FIGS. 26A and 26B the height of the portion above the reference position Pr is denoted by $du\_c$, and the height of the portion below the reference position Pr is denoted by $du\_n$. The reference position Pr and the heights $du\_c$ and $du\_n$ may be calculated from the following formulas.

$Pr=(bk[n].eyc+bk[n].syn)/2$ $du\_c=Pr-bk[a].syc$ $du\_n=bk[n].eyn-Pr$

Figure 30A:
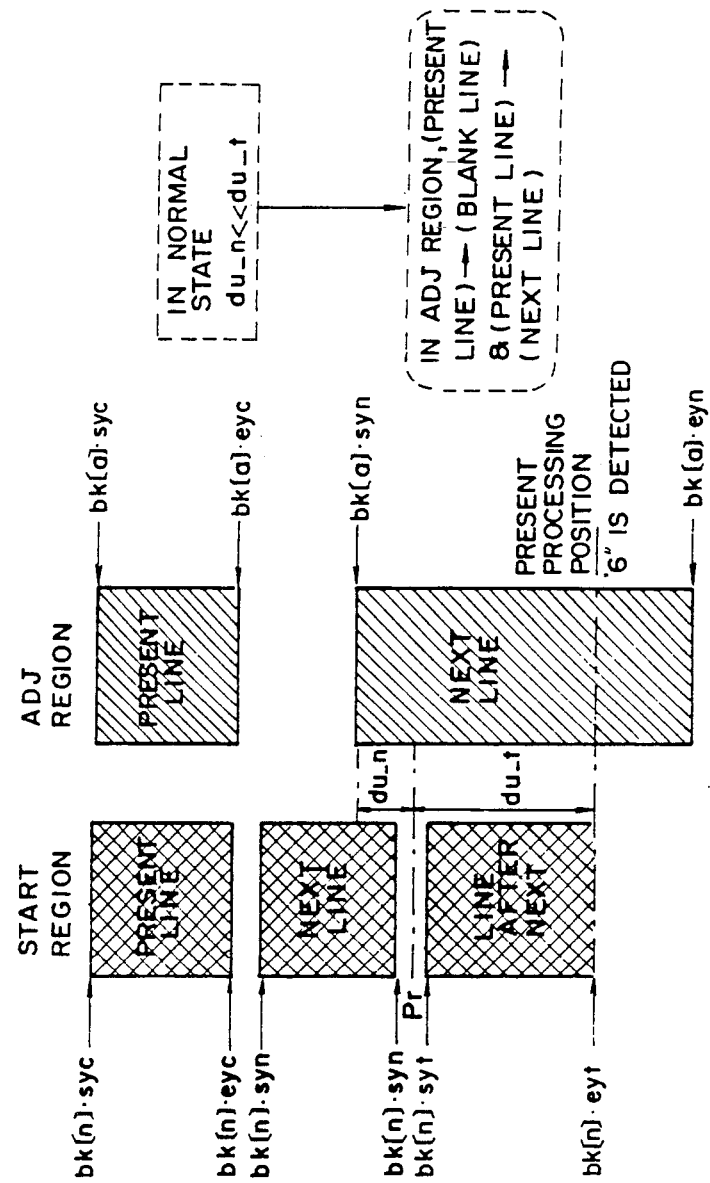
Figure 30B:
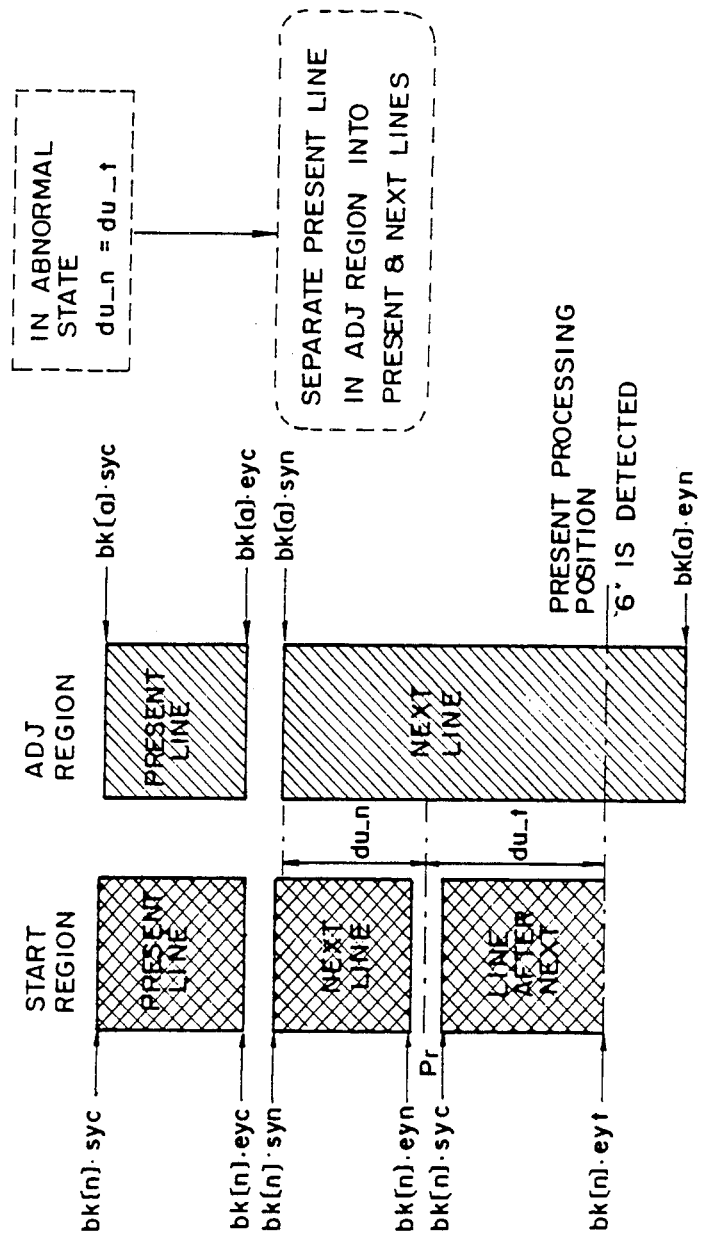

The line connection is detected with respect to the line next to the next line in a manner similar to the above, as shown in FIGS. 30A and 30B. In this case, the line connection in the line next to the next line is detected in the adjacent divided region when the segmentation of the line next to the next line is ended. In addition, the subject of the forced separation is the next line in the adjacent divided region. But in this case, the processing system must support the line next to the next line in order to detect the line connection of the next line and make the forced separation of the connected line.

According to the fifth through seventh embodiments, the line connection is detected in a minimum number of times and the forced separation position is appropriately determined so that the segmentation accuracy is greatly improved even when the inclination (skew) of the document image is large, the interval between the lines is narrow, or a portion of the line is connected to an adjacent line. Furthermore, it is possible to make the line segmentation and thus the character segmentation at a high speed.

Next, a description will be given of an eighth embodiment of the method of segmenting characters of a document image according to the present invention. In this embodiment, there is an additional process of eliminating an underline, so as to improve the reliability of the line segmentation and thus the character segmentation when there exists an underline which does not make contact with the characters. In this embodiment, the process other than the process of eliminating the underline is the same as that of the sixth embodiment. However, it is of course possible to employ any one of the processes of the second through seventh embodiments as the process other than the process of eliminating the underline.

Figure 31A:
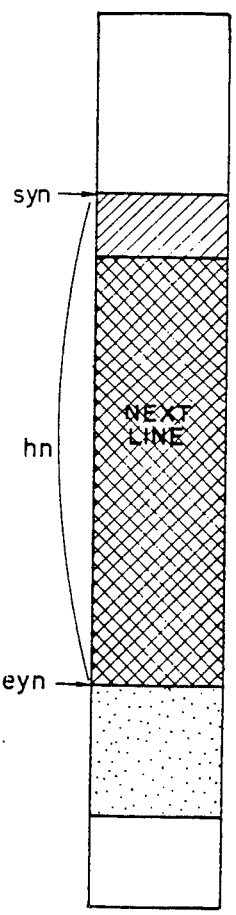
FIGS. 31A and 31B respectively are diagrams for explaining a segmentation state and a determination process thereof in an eighth embodiment of segmenting characters of a document image according to the present invention.
Figure 31B:
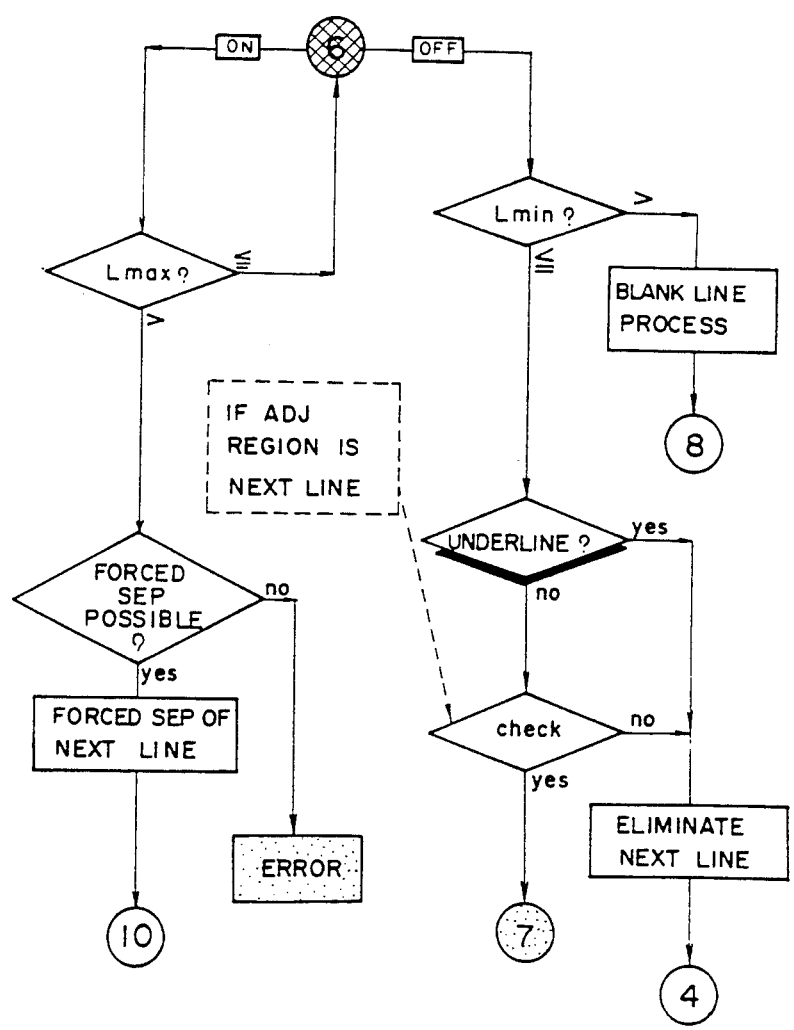

First, when the line segmentation is made and the line height does not satisfy the minimum line height, the underline is detected by discriminating whether or not the segmented portion is an underline. FIGS. 31A and 31B respectively are diagrams for explaining a segmentation state and a determination process thereof in the eighth embodiment when a blank line process is started. In FIGS. 31A and 31B $N_{max}$, $L_{min}$, and $L_{max}$ respectively denote the maximum noise height, the minimum line height, and the maximum line height.

The underline is detected in the following manner.

8-1) A length L of a section in which the vertical projection value of the segmented line is not "0" is detected, and at the same time, a total T of the vertical projection values in this section is obtained.

8-2) An underline is detected when $L \geq L1$ and $T/L \geq Lw$, where L1 denotes a length of the underline within the divided region and Lw denotes a width of the underline within the divided region.

The line (next line) which is discriminated as an underline in this manner is eliminated and the segmentation state is determined to "4" as shown in FIG. 31B.

According to this eighth embodiment, the underline is eliminated by a simple process with an appropriate timing during the transition of the segmentation state when the characters and the underline do not touch each other. Hence, the character segmentation can be made with a high accuracy even when the document image includes an underline.

Further, the present invention is not limited to these embodiments, but various variations and modifications may be made without departing from the scope of the present invention.

What is claimed is:

1. A method of segmenting characters of a document image which has lines of characters thereon, each of said lines extending generally in a first direction, said method comprising the steps of:
dividing the document image in the first direction into a plurality of divided regions and setting a check width with respect to each of the divided regions taken along the first direction, each of the check width being greater than or equal to a width of a corresponding one of the divided regions taken along the first direction so that the check widths of two mutually adjacent divided regions partially overlap each other;

reading image data amounting to one line of the document image;

obtaining from the image data horizontal projections of each line data within each of the check widths, each horizontal projection being a number of black picture elements in a corresponding data line within a check width, each data line being made up of a plurality of picture elements arranged in the first direction;

segmenting a line based on the horizontal projections;

obtaining from the image data vertical projections, each vertical projection being a number of black picture elements in a second direction which is perpendicular to said first direction;

determining a character segmentation range based on the vertical projections; and segmenting each character of the line within the character segmentation range.

2. The method as claimed in claim 1 wherein said step of obtaining the vertical projections extracts the vertical projections in a portion of each divided region determined as a line with respect to a present line and a next line in parallel to a segmentation of the present line made by said step of segmenting the line.

3. The method as claimed in claim 1 which further comprises the step of successively obtaining segmentation states of each of the divided regions, said segmentation state indicating whether the horizontal projections of a data line within a corresponding divided region is ON or OFF and being dependent on a segmentation state of an immediately preceding data line, said ON and OFF states of the horizontal projections respectively indicating whether a number of black picture elements indicated by the horizontal projections is greater than a predetermined threshold value or less than or equal to the predetermined threshold value, said step of segmenting the line making a line segmentation by integrating the segmentation states.

4. The method as claimed in claim 3 wherein said step of segmenting the line integrates the segmentation states in order to segment the line.

5. The method as claimed in claim 3 wherein said step of segmenting the line controls a line segmentation in each divided region using a maximum noise height, a maximum line height and a minimum line height.

6. The method as claimed in claim 3 wherein said step of segmenting the line controls a line segmentation in each divided region by referring to a line segmentation state of an adjacent divided region.

7. The method as claimed in claim 3 wherein said step of segmenting the line includes a substep of detecting a discontinuity of a line between two mutually adjacent divided regions, and a substep of segmenting the line by correcting the discontinuity.

8. The method as claimed in claim 3 wherein said step of segmenting the line includes a substep of detecting whether or not a line connection exists when a line height exceeds a maximum line height, and a substep of forcibly separating a connected line when the line connection is detected, said line connection being defined as a state where a blank space between the lines cannot be detected from the horizontal projections, said connected line being defined as a line in which the line connection occurs.

9. The method as claimed in claim 3 wherein said step of segmenting the line includes a substep of detecting whether or not a contradiction exists in a line connection between two mutually adjacent divided regions, and a substep of forcibly separating a connected line when the line connection is detected, said line connection being defined as a state where a blank space between the lines cannot be detected from the horizontal projections, said connected line being defined as a line in which the line connection occurs.

10. The method as claimed in claim 3 wherein said step of segmenting the line includes a substep of eliminating an underline.

* * * * *